(12) United States Patent
Liu et al.

(10) Patent No.: US 9,602,214 B2
(45) Date of Patent: Mar. 21, 2017

(54) SIGNAL TRANSMISSION METHOD AND DEVICE

(71) Applicant: KUANG-CHI INTELLIGENT PHOTONIC TECHNOLOGY LTD., Shenzhen (CN)

(72) Inventors: Ruopeng Liu, Shenzhen (CN); Linyong Fan, Shenzhen (CN); Guangjin Xiao, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/012,867

(22) Filed: Feb. 2, 2016

(65) Prior Publication Data
US 2016/0149645 A1    May 26, 2016

Related U.S. Application Data

(63) Continuation of application No. PCT/CN2014/083591, filed on Aug. 1, 2014.

(30) Foreign Application Priority Data

Aug. 2, 2013  (CN) .......................... 2013 1 0335477
Sep. 30, 2013  (CN) .......................... 2013 1 0465960

(51) Int. Cl.
*H04B 10/40* (2013.01)
*H04B 10/116* (2013.01)

(52) U.S. Cl.
CPC ........... *H04B 10/40* (2013.01); *H04B 10/116* (2013.01)

(58) Field of Classification Search
CPC ............................. H04B 10/40; H04B 10/116
USPC ......................................................... 398/135
See application file for complete search history.

(56) References Cited

U.S. PATENT DOCUMENTS

| 6,014,236 A | * | 1/2000 | Flaherty | ............... | H04B 10/114 359/356 |
| 2011/0026918 A1 | * | 2/2011 | Kim | .................... | H04B 10/1143 398/27 |
| 2012/0128366 A1 | * | 5/2012 | Lee | .................... | H04B 10/1121 398/118 |

(Continued)

FOREIGN PATENT DOCUMENTS

| CN | 102801473 A | 11/2012 |
| CN | 102980574 A | 3/2013 |

(Continued)

*Primary Examiner* — Dalzid Singh
(74) *Attorney, Agent, or Firm* — Perkins Coie LLP

(57) ABSTRACT

The present invention provides a signal transmission method and device. The device includes: a transmitting device, configured to transmit a first signal to an opposite terminal; and a receiving device, configured to receive a second signal transmitted by the opposite terminal, where a frequency of the first signal is different from a frequency of the second signal, and the frequency of the first signal and/or the frequency of the second signal are/is in a frequency band of visible light. The present invention resolves a problem in a related technology that poor reliability of uplink and downlink signal transmission is caused when signals of a same frequency are used for uplink and downlink transmission, and provides a beneficial effect of improving reliability of uplink and downlink signal transmission.

20 Claims, 17 Drawing Sheets

(56) References Cited

U.S. PATENT DOCUMENTS

2014/0255038 A1* 9/2014 Richards, IV ....... H04B 10/116
398/118

FOREIGN PATENT DOCUMENTS

| CN | 103199939 A | 7/2013 |
| CN | 103795466 A | 5/2014 |
| CN | 103825654 A | 5/2014 |

* cited by examiner

SIGNAL TRANSMISSION METHOD AND DEVICE

CROSS REFERENCE TO RELATED APPLICATIONS

This application is a continuation of PCT Application No. PCT/CN2014/083591 filed on Aug. 1, 2014, which claims priority to Chinese patent application No. 201310335477.0 of Aug. 2, 2013 and Chinese patent application No. 201310465960.0 of Sep. 30, 2013, all of which are incorporated herein by reference.

TECHNICAL FIELD

The present invention relates to the field of light communication, and in particular, to a signal transmission method and device.

BACKGROUND

Visible light is used to perform data transmission in visible light communication. Compared with microwave technologies, the visible light communication has abundant spectrum resources, which is incomparable with general microwave communication and wireless communication. Meanwhile, the visible light communication is applicable to any communications protocol, and is suitable for any environment. In addition, signal coverage of the visible light communication can be controlled easily, and communication content can hardly be intercepted and has relatively high security. Furthermore, a visible light communication device features flexibility and convenience with low costs, and is applicable to large-scale popularity and application.

Currently, signal transmission mainly uses white light or monochromatic light to perform light signal transmission. However, if light signals of a same color are used in uplink and downlink transmission, reliability of received light signals may be affected. For example, a transmit/receive device transmits a white light signal in the uplink and receives a white light signal in the downlink. In this case, when receiving the white visible light signal in the downlink, the light signal transmission device may be affected by the white light signal emitted by itself.

In addition, the light communications technology is a new technology that uses a fluorescent lamp, a light emitting diode LED, or the like that sends high-speed dark and dim-flashing signals invisible to eyes to transmit information, and provides different 1 and 0 sequences by changing a rate at which an LED is turned on or off, so as to encode data and perform data transmission in free space. Then encoding is performed after data is received by a light receiver on a receiving end, to restore information such as original data.

In an existing technology, since a light flashing manner is used to transmit signals, and there is only one path for an air channel, after sampling and an analog-to-digital conversion are performed on each input signal, a light signal transmitting end can send each input signal only through a single air channel. Even if a light signal receiving end has dual channels for output, and a play device can receive signals from dual channels and play through dual channels, a signal finally output to the play device can only be a single-signal because received light input is in only one channel.

For example, a wireless photonic conference system, as an application of the visible light communications technology, adopts visible light to transmit an audio signal. The wireless photonic conference system includes a light signal transmitter and a light signal receiver, which are connected in a wireless manner. The light signal transmitter can convert audio information, transferred from a microphone, to one serial digital signal; modulate the signal to an LED; and send the signal through the LED. The light signal receiver can receive a light signal from an LED, convert the light signal to an electrical signal, and convert the electrical signal to an analog audio signal through a digital-to-analog conversion, so as to drive a play device, such as a headphone, to play sound. By using light transmission of the photonic conference system, wireless transmission of the audio signal is implemented. However, after sampling and an analog-to-digital conversion are performed on each type of input audio signal by the light signal transmitter, the audio signal can be transmitted only through a single air channel; therefore, light input received by the light signal receiver can be only an audio signal of a single sound channel, and only sound of a single sound channel can be played even if a sound play device has a dual-sound channel stereo function.

With regard to the problems in a related technology, no effective solution is provided as of now.

SUMMARY

Embodiments of the present invention provide a signal transmission method and device, which are used to solve at least the foregoing problem. According to a first aspect of the embodiments of the present invention, a visible light signal transmission device is provided, where the signal transmission device communicates with an opposite terminal. The device includes: a transmitting device, configured to transmit a first signal to the opposite terminal; and a receiving device, configured to receive a second signal transmitted by the opposite terminal, where a frequency of the first signal is different from a frequency of the second signal, and the frequency of the first signal and/or the frequency of the second signal are/is in a frequency band of visible light; the first signal is a visible light signal of a first color, the second signal is a visible light signal of a second color, and the first color and the second color are different; and the receiving device includes: multiple optical-to-electrical converters, disposed in different angles and configured to receive the visible light signal of the second color transmitted by the opposite terminal; and a comparator, configured to compare average powers of visible light signals of the second color that are transmitted by the opposite terminal and received by the multiple optical-to-electrical converters, and configured to select a visible light signal of the second color with a largest average power and perform corresponding processing, so as to obtain an original signal transmitted by the opposite terminal.

Preferably, the first signal is a visible light signal, and the second signal is an infrared signal, a WIFI signal, or a bluetooth signal.

Preferably, the transmitting device includes: an encoder, configured to encode an input electrical signal; a driver, configured to amplify an encoded electrical signal; and an electrical-to-optical converter, configured to perform an electrical-to-optical conversion on the amplified electrical signal to generate the visible light signal of the first color.

Preferably, the transmitting device further comprises: a first light filter, configured to perform a filtration on the visible light signal of the first color generated by the electrical-to-optical converter, so as to obtain a filtered visible light signal of the first color.

Preferably, the receiving device includes: an optical-to-electrical converter, configured to perform an optical-to-electrical conversion on the visible light signal of the second color to generate an electrical signal; an amplifier, configured to amplify the electrical signal; and a decoder, configured to decode the amplified electrical signal to obtain the original signal transmitted by the opposite terminal.

Preferably, the receiving device further includes: a second light filter, configured to perform a filtration on the visible light signal of the second color, so as to obtain a filtered visible light signal of the second color, where the optical-to-electrical converter is configured to perform an optical-to-electrical conversion on the filtered visible light signal of the second color.

Preferably, the original signal is an audio signal.

Preferably, the transmitting device further includes: a serial-to-parallel converter, configured to convert an input serial electrical signal to multiple parallel electrical signals; and multiple electrical-to-optical converters, configured to convert the multiple parallel electrical signals to multiple visible light signals of the first color that are parallel and that have different colors, and configured to transmit the multiple visible light signals of the first color that are parallel and that have different colors to the opposite terminal.

Preferably, the transmitting device further includes: multiple optical-to-electrical converters, configured to receive multiple visible light signals of the second color that are parallel and transmitted by the opposite terminal and that have different colors, and configured to perform an optical-to-electrical conversion on the multiple visible light signals of the second color that are parallel and that have different colors, to obtain multiple parallel electrical signals; and a parallel-to-serial converter, configured to convert the multiple parallel electrical signals to one electrical signal.

According to another aspect of the embodiments of the present invention, a signal transmission method is provided, including: transmitting, by a light transmitting device, a first signal to an opposite terminal; and receiving, by a light receiving device, a second signal from the opposite terminal, where a frequency of the first signal is different from a frequency of the second signal, and the frequency of the first signal and/or the frequency of the second signal are/is in a frequency band of visible light; the first signal is a visible light signal of a first color, the second signal is a visible light signal of a second color, and the first color and the second color are different; the visible light signal of the second color from the opposite terminal is received by multiple optical-to-electrical converters disposed in different angles; and average powers of visible light signals of the second color that are from the opposite terminal and that are received by the multiple optical-to-electrical converters are compared, and a visible light signal of the second color that has a largest average power is selected and corresponding processing is performed on the visible light signal, so as to obtain an original signal transmitted by the opposite terminal.

Preferably, the first signal is a visible light signal, and the second signal is an infrared signal, a WIFI signal, or a bluetooth signal.

Preferably, before the transmitting, by a light transmitting device, a first signal to an opposite terminal, the method further includes: encoding an input electrical signal, and amplifying an encoded electrical signal; and performing an electrical-to-optical conversion on the amplified electrical signal to generate the visible light signal of the first color.

Preferably, the step of performing an electrical-to-optical conversion on the amplified electrical signal to generate the visible light signal of the first color includes: performing an electrical-to-optical conversion on the amplified electrical signal to obtain a light signal; and performing a filtration on the light signal to obtain the visible light signal of the first color.

Preferably, after the receiving, a second signal from the opposite terminal, the method further includes: performing an optical-to-electrical conversion on the visible light signal of the second color to generate an electrical signal; and amplifying the electrical signal, and decoding the amplified electrical signal, to obtain the original signal transmitted by the opposite terminal.

Preferably, the step of performing an optical-to-electrical conversion on the visible light signal of the second color includes: performing a filtration on the light signal of the second color to obtain a filtered visible light signal of the second color; and performing an optical-to-electrical conversion on the filtered visible light signal of the second color.

Preferably, the visible light signal of the second color from the opposite terminal is received by multiple optical-to-electrical converters disposed in different angles.

Preferably, average powers of visible light signals of the second color that are from the opposite terminal and that are received by the multiple optical-to-electrical converters are compared, and a visible light signal of the second color that has a largest average power is selected and corresponding processing is performed on the visible light signal, so as to obtain an original signal transmitted by the opposite terminal.

Preferably, before the encoding an input electrical signal, the method further includes: converting an audio signal, to generate the electrical signal.

Preferably, the transmitting a visible light signal of a first color to an opposite terminal includes: transmitting multiple visible light signals of the first color that are parallel and that have different colors to the opposite terminal.

Preferably, before the transmitting multiple visible light signals of the first color that are parallel and that have different colors to the opposite terminal, the method further includes: converting an input serial electrical signal to multiple parallel electrical signals; and converting the multiple parallel electrical signals to multiple visible light signals of the first color that are parallel and that have different colors.

Preferably, the receiving the visible light signal of the second color from the opposite terminal includes: receiving multiple visible light signals of the second color from the opposite terminal that are parallel and that have different colors.

Preferably, after the receiving multiple visible light signals of the second color from the opposite terminal that are parallel and that have different colors, the method further includes: performing an optical-to-electrical conversion on the multiple visible light signals of the second color from the opposite terminal that are parallel and that have different colors, to obtain multiple parallel electrical signals; and converting the multiple parallel electrical signals to one electrical signal.

Preferably, before transmitting, by the light transmitting device, a first signal and a second signal to the opposite terminal, the method further includes: performing, by the light transmitting device, sampling on signals input in parallel from multiple channels; performing, by the light transmitting device, processing on sampled data, and converting sampled data processed by each channel to a corresponding light signal sequence; and receiving, by the light receiving device, a first signal and a second signal further includes: converting a light signal sequence representing the first signal and the second signal to an electrical signal sequence; performing processing on the electrical signal sequence, and identifying a channel corresponding to the electrical signal sequence; and outputting to the corresponding channel a processed electrical signal sequence according to an identifying result.

Preferably, each sampling cycle of the light transmitting device comprises multiple sampling periods that are in one-to-one correspondences with multiple channels, and the light transmitting device samples signals on a channel corresponding to each sampling period.

Preferably, the converting sampled data processed by each channel to a corresponding light signal sequence and transmitting the light signal sequence includes: converting, according to a sampling sequence, the sampled data processed by each channel to the corresponding light signal sequence, and transmitting the light signal sequence; and the light receiving device identifies a channel corresponding to the light signal sequence based on at least a receiving order of the light signal sequence.

Preferably, upon the converting, according to a sampling sequence, the sampled data processed by each channel to the corresponding light signal sequence, and transmitting the light signal sequence, a specified time interval is set between transmission of light signals of two adjacent channels; and the light receiving device identifies the channel corresponding to the light signal sequence according to a receiving order of the light signal sequence and the time interval between the channels.

Preferably, the step of performing, by the light transmitting device, processing on sampled data includes: adding, to the sampled data of each channel, a data head corresponding to the channel; identifying a channel corresponding to an electrical signal sequence according to a data head of the electrical signal sequence; or the converting sampled data processed by each channel to a corresponding light signal sequence and transmitting the light signal sequence comprises: converting the sampled data processed by each channel to a light signal of a wavelength corresponding to the channel, and transmitting the light signal; and the light receiving device identifies, according to a wavelength of the light signal sequence, the channel corresponding to the light signal sequence.

According to the embodiments of the present invention, at a light transmission device end in a light communications system, the light transmission device performs sampling on signals input in parallel from multiple channels, performs processing respectively on sampled data, and converts sampled data processed by each channel to a corresponding light signal sequence and transmits the light signal sequence; in a light receiving device end, the light receiving device identifies a channel corresponding to a signal during a process of processing a received signal, and outputs a processed signal to the corresponding channel according to an identifying result. In this way, signals of multiple channels can be transmitted through one channel and also can be received and processed through one channel, which achieves a better effect at a receiver side.

In addition, in the embodiments of the present invention, a first signal is transmitted and a second signal is received at the same time, where a frequency of the first signal is different from a frequency of the second signal, and the frequency of the first signal and/or the frequency of the second signal are/is in a frequency band of visible light, which resolves a problem, in a related technology, of poor reliability of uplink and downlink signal transmission, thereby improving reliability of uplink and downlink signal transmission.

BRIEF DESCRIPTION OF DRAWINGS

The accompanying drawings described herein are intended for facilitating better understanding of the present invention, and constitute a part of this application. Exemplary embodiments and descriptions in the present invention are intended to explain the present invention and do not constitute any improper limitation on the present invention. In the accompanying drawings.

Figure 1:
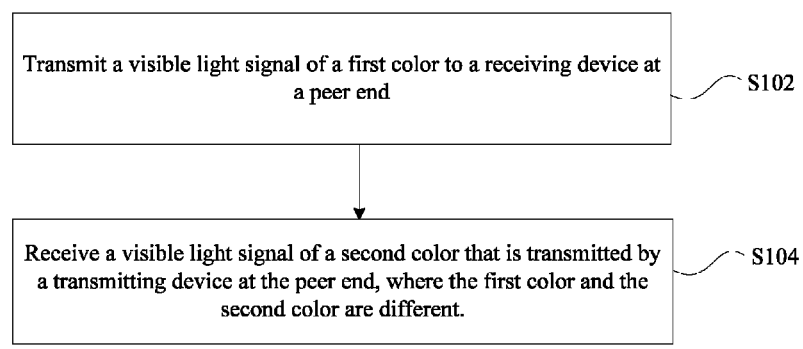
FIG. 1 is a flowchart of a visible light transmission method according to an embodiment of the present invention.

Reference numerals in the accompanying drawings are as follows: 202: transmitting device; 204: receiving device; 2022: encoder; 2024: driver; 2026: electrical-to-optical converter; 2042: optical-to-electrical converter 2044: amplifier; 2046: decoder; 302: power supply 304: red-light LED; 306: blue-light PD; 404: white-light LED 406: PD; 408: red-light filter; 410: blue-light filter; 502: prism; 602: TIA; 604: MCU; 606: DA; 608: audio output interface; 902: serial-to-parallel converter; 904: LED; 906: parallel-to-serial converter; 908: filter; 1402: power divider; 1404: LPF; 1406: comparator.

DESCRIPTION OF EMBODIMENTS

The following describes the present invention in detail with reference to accompanying drawings and embodiments. It should be noted that the embodiments in this application and features in the embodiments may be combined with each other without conflicts.

An embodiment of the present invention provides a visible light signal transmission method. FIG. 1 is a flowchart of a visible light transmission method according to an embodiment of the present invention. As shown in FIG. 1, the method includes the following steps:

S102: Send a visible light signal of a first color to an opposite terminal.

S104: Receive a visible light signal of a second color transmitted by the opposite terminal, where the first color and the second color are different.

In a related technology, when white light or monochromatic light is used in visible light communication to perform visible light transmission, if visible light signals of a same color are used in uplink and downlink transmission, reliability of received visible light signals may be affected. For example, a visible light signal transmission device transmits a white visible light signal in the uplink and receives a white visible light signal in the downlink. In this case, when receiving the white visible light signal in the downlink, the visible light signal transmission device may be affected by the white visible light signal emitted by itself. By using the foregoing step, visible light of different colors can be used in the uplink and downlink transmission, which resolves a problem, in a related technology, of poor reliability of uplink and downlink signal transmission, thereby improving reliability of uplink and downlink signal transmission. It should be noted that, there is no specific sequence between step S102 and step S104, that is, step S102 may be performed before step S104, or step S102 may be performed after step S104, or steps S102 and S104 may be performed at the same time.

Before the first signal of the first color is transmitted, the method may further include: encoding an input electrical signal, and amplifying an encoded electrical signal; and performing an electrical-to-optical conversion on the amplified electrical signal to generate the visible light signal of the first color. By using the foregoing step, an electrical signal may be converted to a visible light signal, and then transmitted by using the visible light signal. Specifically, during transmission, a visible light signal features a small transmission loss, a smaller loss compared with that of a coaxial cable, and passband, high voltage resistance, and invulnerability to electromagnetic interference. Therefore, conversion of an electrical signal into a light signal is more beneficial to signal transmission.

The step of performing an electrical-to-optical conversion on the amplified electrical signal to generate the visible light signal of the first color may include: performing an electrical-to-optical conversion on the amplified electrical signal to obtain a light signal; and performing a filtration on the light signal to obtain the visible light signal of the first color. By using the foregoing step, a monochromatic light with a relatively good transmission effect can be selected to perform the transmission. For example, after the electrical signal is converted into white visible light, filtration can be performed on the white visible light signal to obtain blue visible light. Further, the blue visible light with a relatively good transmission effect can be used to perform the transmission, thereby improving reliability of visible light transmission. Specifically, visible light has various colors. During uplink and downlink transmission, if visible light of different colors are used to perform visible light transmission, interference on the uplink and downlink transmission can be reduced, thereby improving signal transmission quality.

After the visible light of the second color is received, the method may further include: performing an optical-to-electrical conversion on the visible light signal of the second color to generate an electrical signal; and amplifying the electrical signal, and decoding the amplified electrical signal, to obtain an original signal transmitted by the opposite terminal. By using the foregoing step, a received visible light signal is converted to an electrical signal, and further the electrical signal is further decoded to obtain the original signal transmitted by the opposite terminal. After receiving a light signal, a receiving end needs to perform processing on the light signal, to convert the light signal to an electrical signal, so that an original signal can be obtained more easily.

Specifically, the step of performing an optical-to-electrical conversion on the visible light signal of the second color may further include: performing a filtration on the light signal of the second color to obtain a filtered visible light signal of the second color; and performing an optical-to-electrical conversion on the filtered visible light signal of the second color. By using the foregoing step, a filtration is performed on a visible light signal to obtain a visible light signal with higher transmission reliability, and then further processing is performed.

The visible light signal of the second color may be received by multiple optical-to-electrical converters disposed in different angles; and average powers of visible light signals of the second color that are received by the multiple optical-to-electrical converters are compared, and a visible light signal with a largest average power is selected and corresponding processing is performed, so as to obtain the original signal transmitted by the opposite terminal. By using the foregoing step, a visible light signal with a best signal is selected for processing, thereby improving reliability of visible light transmission. Specifically, an average power is a parameter for measuring visible light transmission quality, selecting a visible light signal with a highest average power is selecting a visible light signal that has the best transmission quality, thereby improving visible light signal transmission quality.

Before the encoding an input electrical signal, the method may further include: converting an audio signal, to generate the electrical signal. By using the foregoing step, an audio signal is transmitted through a visible light signal, so that the audio signal is invulnerable to interference. Specifically, in a related technology, an audio signal is generally transmitted by using another transmission mode which makes the audio signal invulnerable to interference during transmission; however, when an audio signal is transmitted by using a visible light signal, transmission quality can be greatly improved.

When a visible light signal is transmitted, it may be that only one visible light signal is transmitted, or that multiple parallel visible light signals are transmitted at the same time, and each of the parallel visible light signals has a different color. By using the foregoing step, visible light of various colors can be used to implement parallel output of visible light signals, thereby improving a transmission rate of the visible light signals. In a related technology, generally, one visible light signal is transmitted. In such a transmission manner, a volume of transmitted data is limited by the number of visible light signals, resulting in a low transmission rate; however, when multiple visible light signals are used, a transmission rate of the visible light signals is obviously improved.

Preferably, before transmitting multiple visible light signals of the first color that are parallel and that have different colors, the method may further include: converting an input serial electrical signal to multiple parallel electrical signals; and converting the multiple parallel electrical signals to multiple visible light signals of the first color that are parallel and that have different colors. By using the foregoing step, a serial electrical signal is converted into multiple parallel visible light signals. In this way, a transmission rate of the visible light signals is improved.

The receiving the visible signal of the second color may be receiving only one visible signal of the second color transmitted by the opposite terminal, or may be receiving multiple visible signals of the second color that are parallel and transmitted by the opposite terminal and that have different colors. By receiving multiple parallel visible light signals, transmission efficiency of the visible light signal is improved.

After the receiving multiple visible light signals of the second color from the opposite terminal that are parallel and that have different colors, the method may further include: performing an optical-to-electrical conversion on the multiple visible light signals of the second color from the opposite terminal that are parallel and that have different colors, to obtain multiple parallel electrical signals; and converting the multiple parallel electrical signals to one electrical signal. By using the foregoing step, multiple parallel visible light signals are converted to one electrical signal, namely, a serial electrical signal, thereby making signal processing easier.

An embodiment of the present invention further provides a signal transmission method. The device includes: transmitting a first signal to an opposite terminal; and receiving a second signal from the opposite terminal, where a frequency of the first signal is different from a frequency of the second signal, and the frequency of the first signal and/or the frequency of the second signal are/is in a frequency band of visible light.

Preferably, the first signal is a visible light signal, and the second signal is an infrared signal, a WIFI signal, or a bluetooth signal.

Preferably, the first signal is a visible light signal of a first color, the second signal is a visible light signal of a second color, and the first color and the second color are different.

Figure 2:
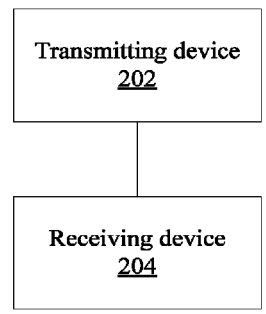
FIG. 2 is a visible light transmission device according to an embodiment of the present invention.

An embodiment of the present invention provides a visible light signal transmission device. FIG. 2 is a visible light transmission device according to an embodiment of the present invention. As shown in FIG. 2, the device includes: a transmitting device 202, configured to transmit a first signal of a first color to an opposite terminal; and a receiving device 204, configured to receive a second signal of a second color transmitted by the opposite terminal, where the first color and the second color are different. In application, a transmission device of a downlink visible light signal and a transmission device of an uplink visible light signal separately transmit monochromatic light of different colors. A receiving device of the transmission device of a downlink visible light signal is sensitive to and receives monochromatic light emitted by a transmitting device of the transmission device of an uplink visible light signal; a receiving device of the transmission device of an uplink visible light signal is sensitive to and receives monochromatic light emitted by a transmitting device of the transmission device of a downlink visible light signal. In this way, visible light of two different colors can be used to perform uplink and downlink transmission, respectively.

Preferably, the transmitting device 202 further includes: an encoder, configured to encode an input electrical signal; a driver, configured to amplify an encoded electrical signal; and an electrical-to-optical converter, configured to perform an electrical-to-optical conversion on the amplified electrical signal to generate the visible light signal of the first color.

Preferably, the transmitting device 202 further includes: a first light filter, configured to perform a filtration on the visible light signal of the first color generated by the electrical-to-optical converter, so as to obtain a filtered visible light signal of the first color.

Preferably, the receiving device includes: an optical-to-electrical converter, configured to perform an optical-to-electrical conversion on the visible light signal of the second color to generate an electrical signal; an amplifier, configured to amplify the electrical signal; and a decoder, configured to decode the amplified electrical signal to obtain an original signal transmitted by the opposite terminal.

Preferably, the receiving device 204 further includes: a second light filter, configured to perform a filtration on the visible light signal of the second color, so as to obtain a filtered visible light signal of the second color, where the optical-to-electrical converter is configured to perform an optical-to-electrical conversion on the filtered visible light signal of the second color.

Preferably, the receiving device 204 includes: multiple optical-to-electrical converters, disposed in different angles and configured to receive the visible light signal of the second color; and a comparator, configured to compare average powers of the visible light signals received by the multiple optical-to-electrical converters, and configured to select a visible light signal with a largest average power and perform corresponding processing, so as to obtain an original signal transmitted by the opposite terminal.

Preferably, the decoder is further configured to decode the amplified electrical signal to obtain an audio signal transmitted by the opposite terminal.

Preferably, the device further includes: a serial-to-parallel converter, configured to convert an input serial electrical signal to multiple parallel electrical signals; and multiple electrical-to-optical converters, configured to convert the multiple parallel electrical signals to multiple visible light signals of the first color that are parallel and that have different colors, and transmit the multiple visible light signals of the first color that are parallel and that have different colors.

Preferably, the device further includes: multiple optical-to-electrical converters, configured to receive multiple visible light signals of the second color from the opposite terminal that are parallel and that have different colors, and configured to perform an optical-to-electrical conversion on the multiple visible light signals of the second color from the opposite terminal that are parallel and that have different colors, to obtain multiple parallel electrical signals; and a parallel-to-serial converter, configured to convert the multiple parallel electrical signals to one electrical signal.

An embodiment of the present invention further provides a signal transmission device. As shown in FIG. 2, the device includes a transmitting device 202 and a receiving device 204. The transmitting device 202 is configured to transmit a first signal to an opposite terminal; and the receiving device 204 is configured to receive a second signal transmitted by the opposite terminal, where a frequency of the first signal is different from a frequency of the second signal, and the frequency of the first signal and/or the frequency of the second signal are/is in a frequency band of visible light.

Preferably, the first signal is a visible light signal, and the second signal is an infrared signal, a WIFI signal, or a bluetooth signal.

Preferably, the first signal is a visible light signal of a first color, the second signal is a visible light signal of a second color, and the first color and the second color are different.

An embodiment of the present invention further provides a signal transmission system. The system includes at least one transmitter and at least one receiver, where the transmitter may be the transmitting device in the transmission device in Embodiment 2, and the receiver may be the receiving device in the transmission device in Embodiment 2. The transmitter and the receiver may be in a one-to-one, one-to-multiple, or multiple-to-one correspondence. The transmission system may be configured in a broadcasting system or a conference system.

Figure 3:
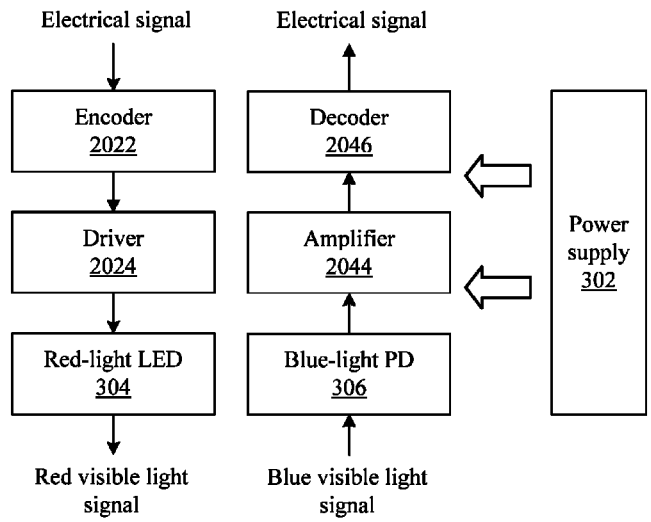
FIG. 3 is a schematic structural diagram of a visible light transmission device according to preferential Embodiment 1 of the present invention.

FIG. 3 is a schematic structural diagram of a visible light transmission device according to preferential Embodiment 1 of the present invention. As shown in FIG. 3, the device includes:

an encoder 2022, configured to encode an input electrical signal, so as to adapt to a modulation light emitting diode (Light Emitting Diode, LED for short);

a driver 2024, configured to amplify an encoded electrical signal and drive a background LED;

a red-light LED 304, configured to perform an electrical-to-optical conversion and transmit a red visible light signal, where the red-light LED 304 is equivalent to the electrical-to-optical converter 2026 in Embodiment 2;

a photo-diode (Photo-Diode, PD for short) 306, where the PD 306 is equivalent to the optical-to-electrical converter 2042 in Embodiment 2, a response wavelength of the photo-diode 306 is within a wavelength range of blue visible light, and the PD 306 is configured to receive a blue visible light signal transmitted by an opposite terminal, perform an optical-to-electrical conversion, and output an electrical signal;

an amplifier 2044, configured to amplify the electrical signal that has undergone the optical-to-electrical conversion;

a decoder 2046, configured to decode the amplified electrical signal to restore an original signal transmitted by the opposite terminal; and a power supply 302, configured to supply power to the transmission device.

The decoder 2022, the driver 2024, and the electrical-to-optical converter 2026 are equivalent to the transmitting device 202, the optical-to-electrical converter 2042, and the amplifier 2044 in Embodiment 2, and the decoder 2046 is equivalent to the receiving device 204 in Embodiment 2.

In this embodiment, the visible light signal transmission device uses visible light of two different colors to perform transmission of uplink and downlink visible light signals, respectively, so that receiving of the visible light signal by the receiving device 204 of the transmission device is not affected by the transmitting device 202, thereby improving reliability of transmission of uplink and downlink visible light signals.

Figure 4:
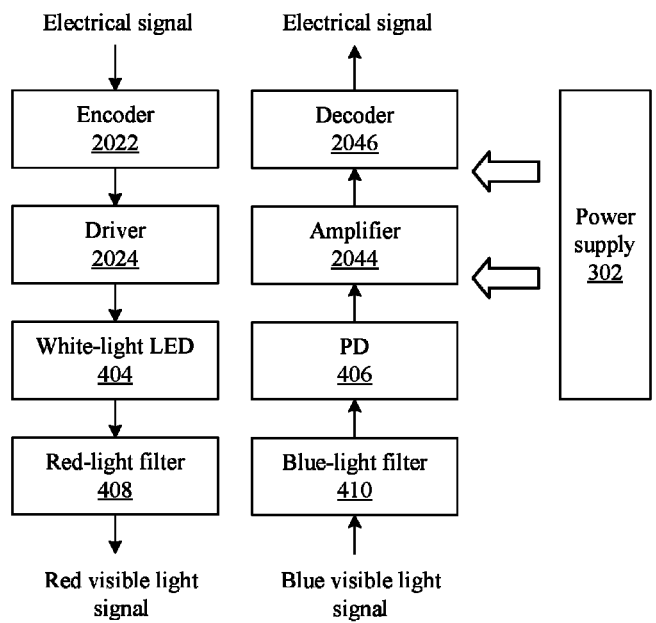
FIG. 4 is a schematic structural diagram of a visible light transmission device according to preferential Embodiment 2 of the present invention.

FIG. 4 is a schematic structural diagram of a visible light transmission device according to preferential Embodiment 2 of the present invention. As shown in FIG. 4, the device includes:

an encoder 2022, configured to encode an input electrical signal, so as to adapt to a modulation LED;

a driver 2024, configured to amplify an encoded electrical signal and drive a background LED;

a white-light LED 404, equivalent to the electrical-to-optical converter 2026 in Embodiment 2, and configured to transmit a white visible light signal;

a red-light filter 408, configured to filter red light from the white visible light signal, to implement transmission of a red visible light signal, where the red-light filter 408 is equivalent to the first filter in Embodiment 2;

a blue-light filter 410, configured to filter blue light from a received visible light signal, to implement selective receiving of a blue visible light signal, where the blue-light filter 410 is equivalent to the second filter in Embodiment 2;

a PD 406, equivalent to the optical-to-electrical converter 2042 in Embodiment 2, and configured to perform an optical-to-electrical conversion on the blue visible light signal, so as to obtain an output electrical signal;

an amplifier 2044, configured to amplify the electrical signal that has undergone the optical-to-electrical conversion;

a decoder 2046, configured to decode the amplified electrical signal to restore an original signal transmitted by the opposite terminal; and a power supply 302, configured to supply power to the transmission device.

Figure 5:
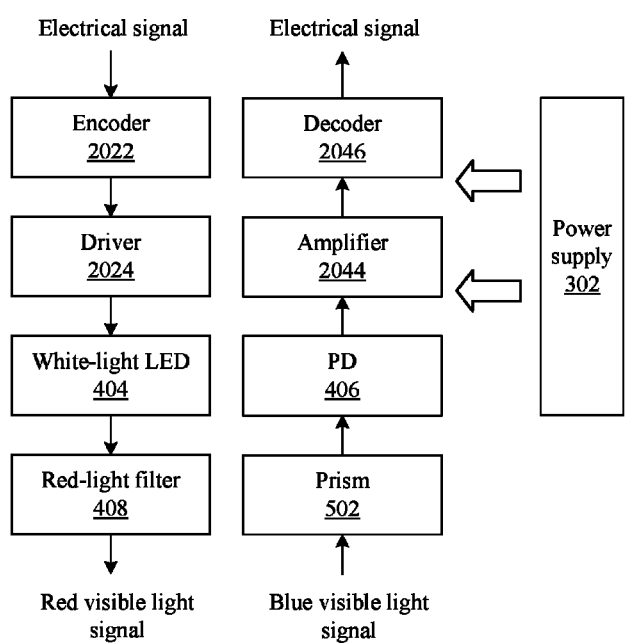
FIG. 5 is a schematic structural diagram of a visible light transmission device according to preferential Embodiment 3 of the present invention.

FIG. 5 is a schematic structural diagram of a visible light transmission device according to preferential Embodiment 3 of the present invention. As shown in FIG. 5, the device includes:

an encoder 2022, configured to encode an input electrical signal, so as to adapt to a modulation LED;

a driver 2024, configured to amplify an encoded electrical signal and drive a background LED;

a white-light LED 404, equivalent to the electrical-to-optical converter 2026 in Embodiment 2, and configured to transmit a white visible light signal;

a red-light filter 408, configured to filter infrared light from the white visible light signal, to implement transmission of a red visible light signal, where the red-light filter 408 is equivalent to the first filter in Embodiment 2;

a prism 502, configured to separate blue light from a received visible light signal, to implement selective receiving of a blue visible light signal, where the prism 502 is equivalent to the second filter in Embodiment 2;

a PD 406, equivalent to the optical-to-electrical converter 2042 in Embodiment 2, and configured to perform an optical-to-electrical conversion on the blue visible light signal, so as to obtain an output electrical signal;

an amplifier 2044, configured to amplify the electrical signal that has undergone the optical-to-electrical conversion;

a decoder 2046, configured to decode the amplified electrical signal to restore an original input signal; and a power supply 302, configured to supply power to the transmission device.

Currently, an audio receiving device based on optical communications mainly receives an audio signal that is transmitted by using an infrared ray. That is, an audio signal is carried on an infrared ray, an infrared signal is received through an infrared receiving device, and then the infrared signal is decoded and restored to the audio signal. However, an infrared signal is vulnerable to interference, such as interference from an infrared ray emitted by a human body or various objects, resulting in signal instability. An embodiment of the present invention provides a transmission device for transmitting a visible light signal carrying audio data. This device has advantages such as interference resistance and performance reliability.

Figure 6:
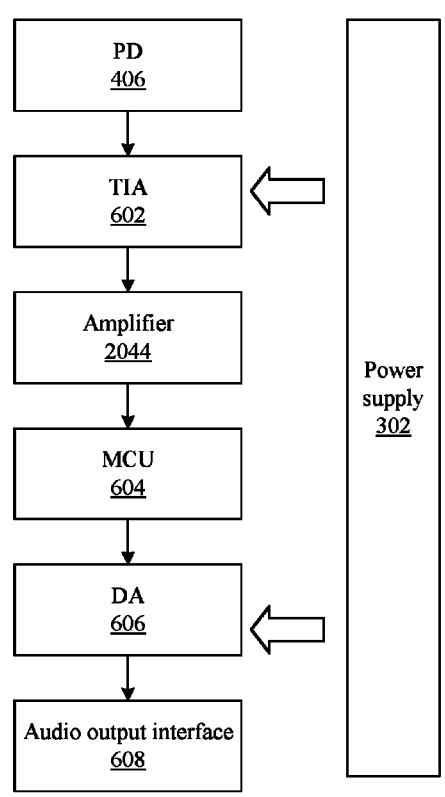
FIG. 6 is a transmission device for transmitting a visible light signal carrying audio data according to an embodiment of the present invention.

FIG. 6 is a transmission device for transmitting a visible light signal carrying audio data according to an embodiment of the present invention. The device includes:

a PD 406, configured to receive a visible light signal, and convert the received visible light signal into an electrical signal, to implement an optical-to-electrical conversion, where the PD 406 is equivalent to the optical-to-electrical converter 2042 in Embodiment 2;

a transimpedence amplifier (Transimpedence Amp, TIA for short) 602, configured to convert a current signal, obtained through conversion by the PD406, to a voltage signal, and amplify the voltage signal;

an amplifier 2044, configured to further amplify the voltage signal output by the TIA 602;

a micro control unit (Micro Control Unit, MCU for short) 604, configured to decode the voltage signal output by the amplifier 2044;

a digital-to-analog converter DA 606, configured to perform a digital-to-analog conversion on a voltage signal obtained through decoding and restore the voltage signal to an audio signal for output, where in the embodiment, MCU 604 and DA 606 are equivalent to the decoder 2046 in Embodiment 2;

an audio output interface 608, configured to output the audio signal to a sound equipment or a headphone; and a power supply 302, configured to supply power to the transmission device.

In the embodiment, an optical-to-electrical conversion is performed on a received visible light signal to obtain an electrical signal; amplification, decoding, and digital-to-analog conversion are performed on the electrical signal to restore the electrical signal into an audio signal; then the audio signal is output by the audio interface 608 to a device such as a headphone or sound equipment.

Figure 7:
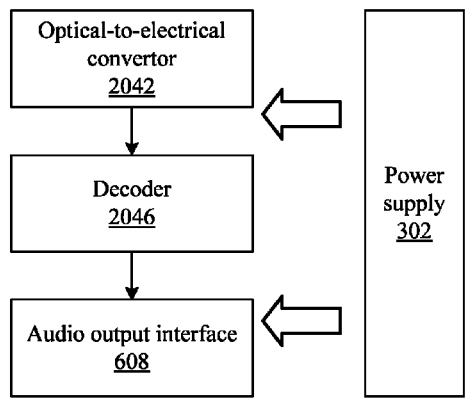
FIG. 7 is a schematic structural diagram of another transmission device for transmitting a visible light signal carrying audio data according to an embodiment of the present invention.

FIG. 7 is a schematic structural diagram of another transmission device for transmitting a visible light signal carrying audio data according to an embodiment of the present invention. The device includes:

an optical-to-electrical converter 2042, configured to receive a visible light signal carrying an audio signal, and convert the visible light signal into an electrical signal, to implement an optical-to-electrical conversion;

a decoder 2046, configured to decode the electrical signal obtained after the optical-to-electrical conversion, to restore the electrical signal to an audio signal;

an audio output interface 608, configured to output the restored audio signal; and a power supply 302, configured to supply power to the transmission device.

In a related technology, visible light communication mainly uses white light or certain monochromatic light to implement visible light signal transmission, and then uses a photo-diode with a corresponding wavelength to implement receiving of a visible light signal. Since a modulation bandwidth of a single LED is limited, a transmission rate of a visible light signal in this transmitting and receiving manner is relatively low. Therefore, this embodiment of the present invention provides a method for performing transmission using visible light of various colors, which implements parallel output and receiving of a visible light signal, thereby improving a transmission rate of the visible light signal.

Figure 8:
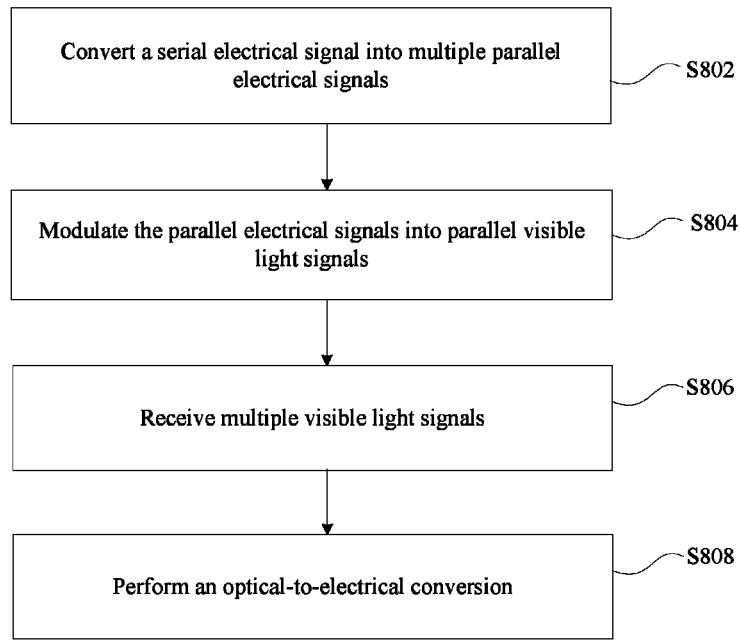
FIG. 8 is a flowchart of a method for transmitting a visible light signal of various colors in parallel according to an embodiment of the present invention.

FIG. 8 is a flowchart of a method for transmitting a visible light signal of various colors in parallel according to an embodiment of the present invention. As shown in FIG. 8, the method includes the following steps:

S802: Convert a serial electrical signal into multiple parallel electrical signals.

At a transmitting end, when one electrical signal, namely, one serial electrical signal, is input, the electrical signal is converted into N (N≥2) electrical signals for parallel output.

S804: Modulate the parallel electrical signals into parallel visible light signals.

The N parallel electrical signals are respectively modulated into visible light signals, and each visible light signal has a different color, thereby implementing parallel output of N visible light signals with different colors.

S806: Receive multiple visible light signals.

At a receiving end, visible lights signals of different colors are received.

S808: Perform an optical-to-electrical conversion.

N visible light signals are converted into N parallel electrical signals, and then the N parallel electrical signals are converted into one electrical signal for output.

Figure 9:
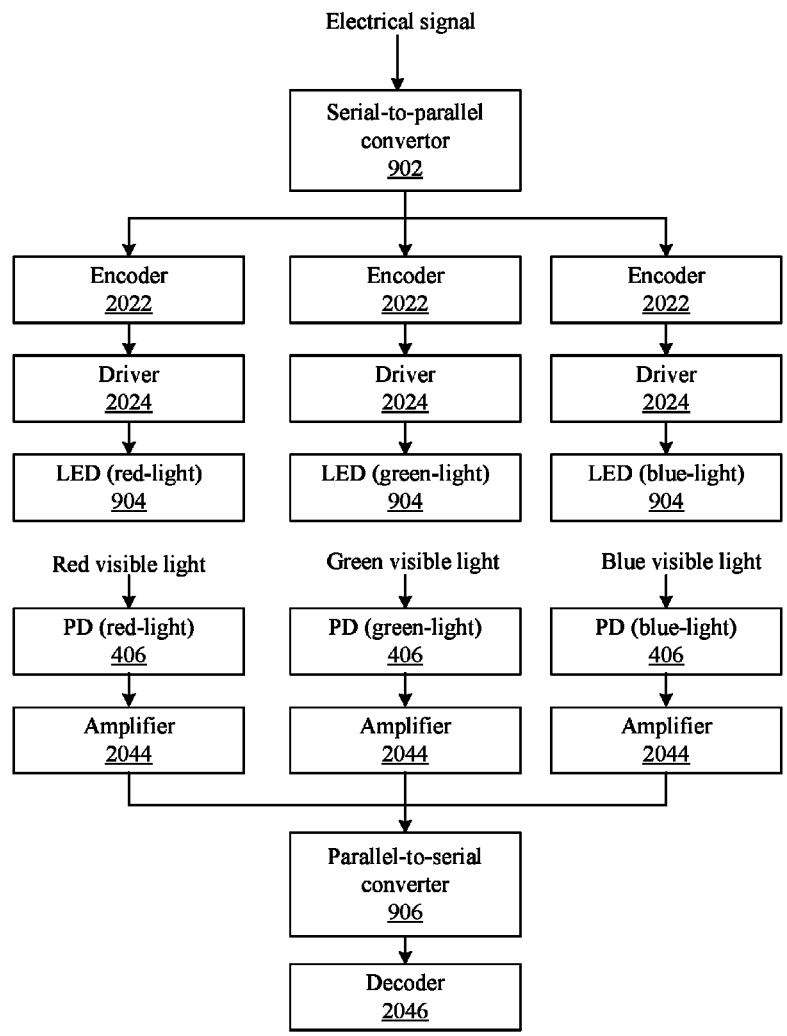
FIG. 9 is schematic structural diagram 1 of a device for transmitting a visible light signal of various colors in parallel according to an embodiment of the present invention.

FIG. 9 is schematic structural diagram 1 of a device for transmitting a visible light signal of various colors in parallel according to an embodiment of the present invention. As shown in FIG. 9, the device includes:

a serial-to-parallel converter 902, configured to convert one input serial electrical signal into N ((N≥2) parallel electrical signals for output;

multiple decoders 2022, configured to separately encode an input electrical signal, so as to adapt to a modulation LED;

multiple drivers 2024, configured to separately amplify an encoded electrical signal and drive a background LED;

multiple LEDs 904, configured to perform an electrical-to-optical conversion and transmit a visible light signal; where: specifically, the multiple LEDs are red-light LEDs, green-light LEDs, and blue-light LEDs; and the red-light LEDs are configured to perform an electrical-to-optical conversion to transmit a red visible light signal, the green-light LEDs are configured to perform an electrical-to-optical conversion to transmit a green visible light signal, and the blue-light LEDs are configured to perform an electrical-to-optical conversion to transmit a blue visible light signal;

multiple PDs 406, configured to receive parallel visible light signals transmitted by an opposite terminal, and configured to perform an optical-to-electrical conversion, where the PDs may be red-light PDs, green-light PDs, and blue-light PDs, where: the red-light PDs, whose response wavelength is within a range of a red visible light wavelength, are configured to receive a red visible light signal, perform an optical-to-electrical conversion, and output an electrical signal; the green-light PDs, whose response wavelength is within a range of a green visible light wavelength, are configured to receive a green visible light signal, perform an optical-to-electrical conversion, and output an electrical signal; and the blue-light PDs, whose response wavelength is within a range of a blue visible light wavelength, are configured to receive a blue visible light signal, perform an optical-to-electrical conversion, and output an electrical signal;

multiple amplifiers 2044, configured to amplify the electrical signal that has undergone the optical-to-electrical conversion;

a parallel-to-serial converter 906, configured to convert N ((N≥2) parallel electrical signals into one serial electrical signal for output; and a decoder 2046, configured to decode the serial electrical signal output by the serial-to-parallel converters 906, and restore the serial electrical signal to an original signal transmitted by the opposite terminal.

In this embodiment of the present invention, LEDs of corresponding colors are used to receive visible light signals of various colors that are transmitted in parallel by an opposite terminal, and the visible light signals are restored into a serial electrical signal through a parallel-to-serial conversion, thereby reducing a requirement on an LED modulation bandwidth and improving a transmission rate of a visible light signal.

Figure 10:
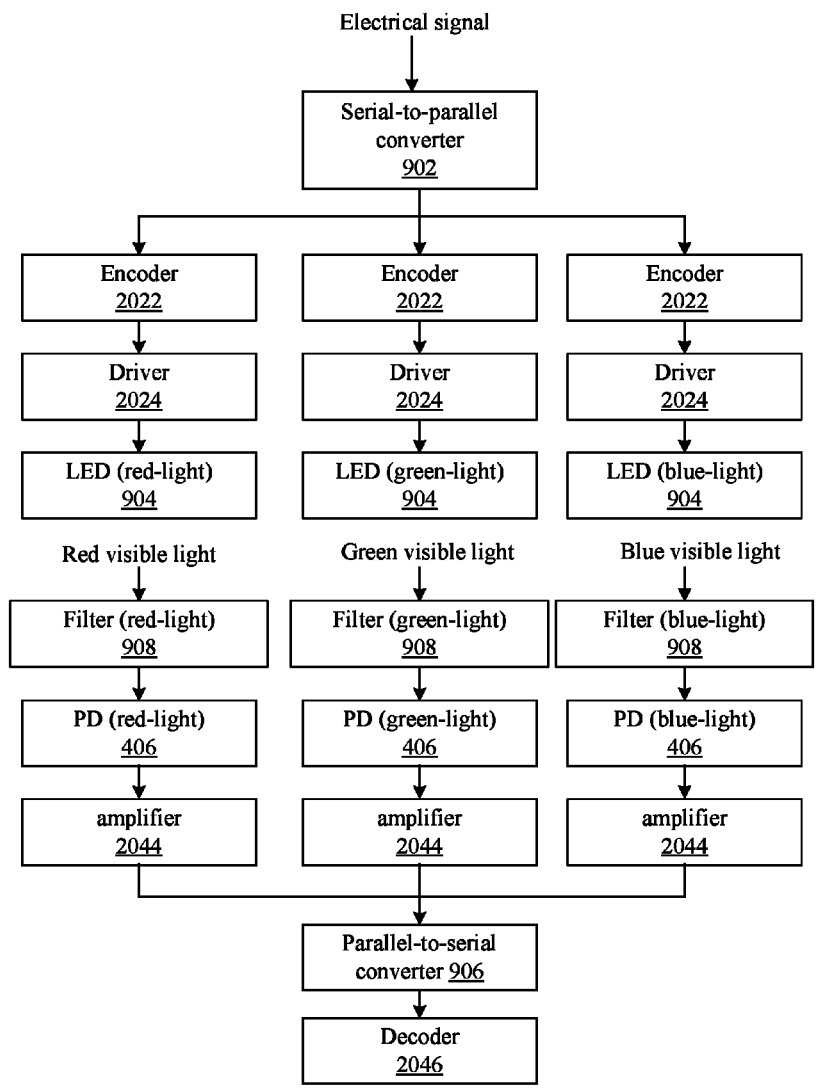
FIG. 10 is schematic structural diagram 2 of a device for transmitting a visible light signal of various colors in parallel according to an embodiment of the present invention.

FIG. 10 is schematic structural diagram 2 of a device for transmitting a visible light signal of various colors in parallel according to an embodiment of the present invention. As shown in FIG. 10, the device includes:

a serial-to-parallel converter 902, configured to convert one input serial electrical signal into N ((N≥2) parallel electrical signals for output;

multiple encoders 2022, configured to encode an input electrical signal, so as to adapt to a modulation LED;

multiple drivers 2024, configured to amplify an encoded parallel electrical signal and drive a background LED;

multiple LEDs 904, configured to perform an electrical-to-optical conversion and transmit a visible light signal; where, specifically, the multiple LEDs are red-light LEDs, green-light LEDs, and blue-light LEDs, where: the red-light LEDs are configured to perform an electrical-to-optical conversion to transmit a red visible light signal; the green-light LEDs are configured to perform an electrical-to-optical conversion to transmit a green visible light signal; and the blue-light LEDs are configured to perform an electrical-to-optical conversion to transmit a blue visible light signal;

multiple filters 908, where the filters may be red-light filters, green-light filters, and blue-light filters; where: the red-light filters are configured to filter red visible light from visible light signals of various colors; the green-light filters are configured to filter green visible light from visible light signals of various colors; and the blue-light filters are configured to filter blue visible light from visible light signals of various colors;

multiple PDs 406, configured to perform an optical-to-electrical conversion on visible light signals obtained through the filtration by the multiple filters 908, where the PDs 406 may include red-light PDs, green-light PDs, and blue-light PDs, where: the red-light PDs, whose response wavelength is within a range of a red visible light wavelength, are configured to receive a red visible light signal, perform an optical-to-electrical conversion, and output an electrical signal; the green-light PDs, whose response wavelength is within a range of a green visible light wavelength, are configured to receive a green visible light signal, perform an optical-to-electrical conversion, and output an electrical signal; and the blue-light PDs, whose response wavelength is within a range of a blue visible light wavelength, are configured to receive a blue visible light signal, perform an optical-to-electrical conversion, and output an electrical signal;

multiple amplifiers 2044, configured to amplify the electrical signal that has undergone the optical-to-electrical conversion;

a parallel-to-serial converter 906, configured to convert N ((N≥2) parallel electrical signals into one serial electrical signal for output; and a decoder 2046, configured to decode the serial electrical signal output by the parallel-to-serial converter 906, and restore the serial electrical signal to an original signal.

In this embodiment of the present invention, filters of corresponding colors are used to respectively filter visible light signals of various colors that are transmitted by an opposite terminal, and the visible light signals are received through LEDs and restored into a serial electrical signal through a parallel-to-serial conversion, thereby reducing a requirement on an LED modulation bandwidth and improving a transmission rate of a visible light signal.

Figure 11:
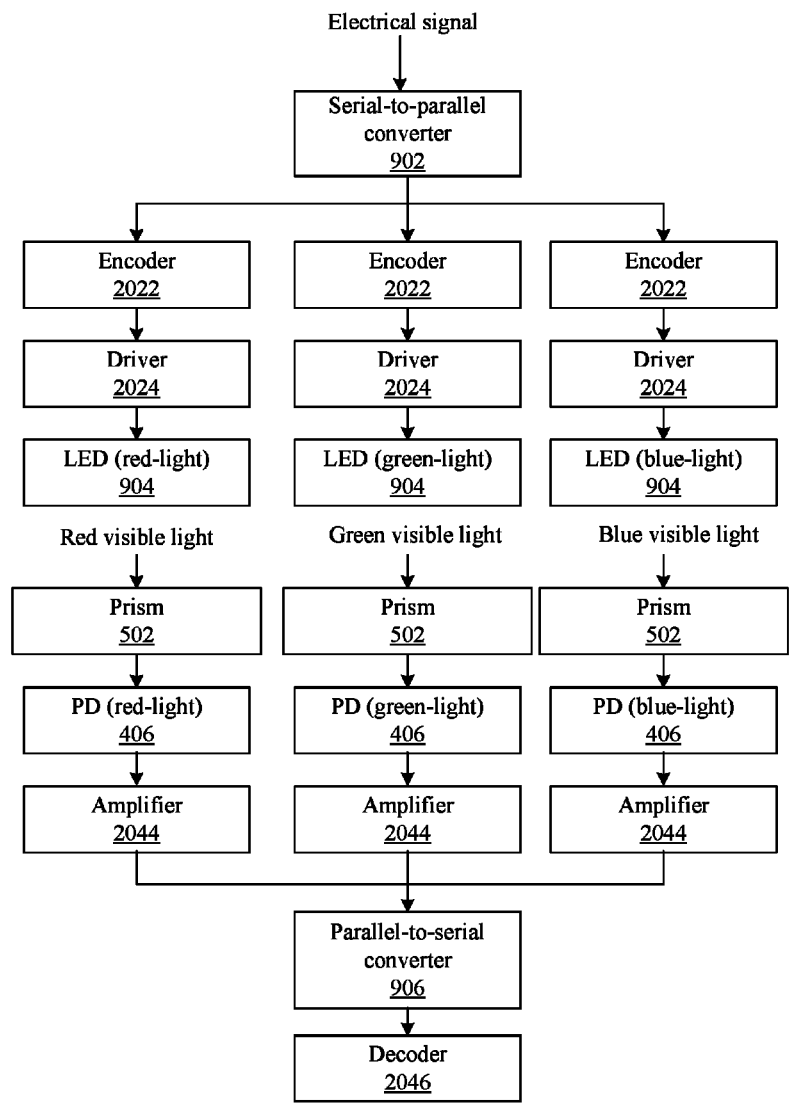
FIG. 11 is schematic structural diagram 3 of a device for transmitting a visible light signal of various colors in parallel according to an embodiment of the present invention.

FIG. 11 is schematic structural diagram 3 of a device for transmitting a visible light signal of various colors in parallel according to an embodiment of the present invention. As shown in FIG. 11, the device includes:

a serial-to-parallel converter 902, configured to convert one input serial electrical signal into N ((N≥2) parallel electrical signals for output;

multiple encoders 2022, configured to encode an input electrical signal, so as to adapt to a modulation LED;

multiple drivers 2024, configured to amplify an encoded parallel electrical signal and drive a background LED;

multiple LEDs 904, configured to perform an electrical-to-optical conversion and transmit a visible light signal, where, specifically, the multiple LEDs are red-light LEDs, green-light LEDs, and blue-light LEDs, where: the red-light LEDs are configured to perform an electrical-to-optical conversion to transmit a red visible light signal; the green-light LEDs are configured to perform an electrical-to-optical conversion to transmit a green visible light signal; and the blue-light LEDs are configured to perform an electrical-to-optical conversion to transmit a blue visible light signal;

multiple prisms 502, configured to filter red, green, or blue light from visible light signals of various colors;

multiple PDs 406, configured to perform an optical-to-electrical conversion on visible light signals obtained through the filtration by the multiple filters 908, where the PDs 406 may include red-light PDs, green-light PDs, and blue-light PDs, where: the red-light PDs, whose response wavelength is within a range of a red visible light wavelength, are configured to receive a red visible light signal, perform an optical-to-electrical conversion, and output an electrical signal; the green-light PDs, whose response wavelength is within a range of a green visible light wavelength, are configured to receive a green visible light signal, perform an optical-to-electrical conversion, and output an electrical signal; and the blue-light PDs, whose response wavelength is within a range of a blue visible light wavelength, are configured to receive a blue visible light signal, perform an optical-to-electrical conversion, and output an electrical signal;

multiple amplifiers 2044, configured to amplify the electrical signal that has undergone the optical-to-electrical conversion;

a parallel-to-serial converter 906, configured to convert N ((N≥2)) parallel electrical signals into one serial electrical signal for output; and a decoder 2046, configured to decode the serial electrical signal output by the parallel-to-serial converter 906, and restore the serial electrical signal to an original signal.

In this embodiment of the present invention, prisms are used to filter visible light signals of various colors that are transmitted by an opposite terminal, the visible light signals obtained through the filtration by the prisms are received through LEDs, and the parallel visible light signals are restored into a serial electrical signal through a parallel-to-serial conversion, thereby reducing a requirement on an LED modulation bandwidth and improving a transmission rate of a visible light signal.

In this embodiment of the present invention, visible light of various colors include but is not limited to red, orange, yellow, green, blue, indigo, and purple. LEDs include but are not limited to common LEDs, LEDs for mobile phones, LEDs for MP3, LEDs for MP4, mobile phone display screens, tablet display screens, display screens for MP3, display screens for MP4, and the like. PDs include but are not limited to PINs, APDs, PINs in response to a particular wavelength, APDs in response to a particular wavelength, and the like.

In a related technology, visible communication mainly uses an LED for transmitting a visible light signal and a photo-diode for receiving a visible light signal. However, a single photo-diode has a limited receiving angle and area, so that a visible light receiving device with a single photo-diode is limited has a limited receiving angle and size. This embodiment uses multiple optical-to-electrical converters that are disposed on the receiving device in different angles to receive the visible light signal, thereby enlarging a receiving angle and size of the visible light signal receiving device.

Figure 12:
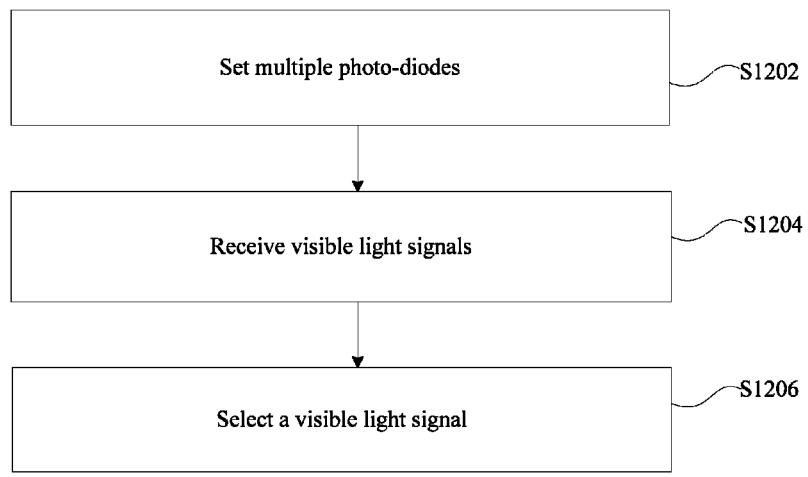
FIG. 12 is flowchart 1 of a method for performing visible light transmission by using multiple optical-to-electrical converters according to an embodiment of the present invention.

FIG. 12 is flowchart 1 of a method for performing visible light transmission by using multiple optical-to-electrical converters according to an embodiment of the present invention. In this embodiment of the present invention, multiple optical-to-electrical converters may be multiple photo-diodes. As shown in FIG. 12, the method includes the following steps:

S1202: Set multiple photo-diodes.

Each photo-diode is disposed on a receiving device in a different angle, so that a receiving angle and size of the visible light receiving device are improved.

S1204: Receive visible light signals.

Multiple photo-diodes receive visible light signals transmitted by an opposite terminal, and perform an optical-to-electrical conversion.

S1206: Select a visible light signal.

Visible light signals received by each photo-diode are converted into electrical signals, an average power of each electrical signal is calculated, the average power is compared, and decoding is performed on an electrical signal that has the largest average power, so as to obtain an original signal transmitted by the opposite terminal.

Figure 13:
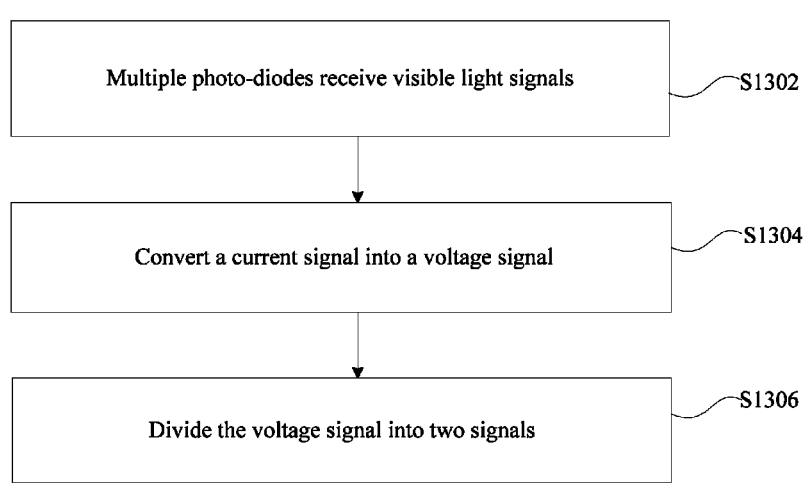
FIG. 13 is flowchart 2 of a method for performing visible light transmission by using multiple optical-to-electrical converters according to an embodiment of the present invention.

FIG. 13 is flowchart 2 of a method for performing visible light transmission by using multiple optical-to-electrical converters according to an embodiment of the present invention. In the embodiment of the present invention, multiple optical-to-electrical converters are multiple photo-diodes. As shown in FIG. 13, the method includes:

S1302: Multiple photo-diodes receive visible light signals.

Each photo-diode is disposed on a receiving surface of a receiving device in a different angle and at a different distance, and is configured to receive a visible light signal, perform an optical-to-electrical conversion on the received signals, and output a current signal.

S1304: Convert a current signal into a voltage signal.

A TIA converts the current signal into the voltage signal.

S1306: Divide the voltage signal into two signals.

A power divider divides a voltage signal input by a TIA into two signals, with one signal output to a low-pass filter (Low-pass Filter, LPF for short) and the other signal output to a controller.

S1308: Calculate an average power of each signal.

An LPF calculates average powers of the signals, which are then compared by a comparator.

S1310: Select a signal with a largest average power.

A comparator compares average powers of every two signals, retains a voltage signal that has a larger average power, then selects a voltage signal that has the largest average power, and finally feeds back the voltage signal to a controller.

S1312: Output a voltage signal that has the largest average power.

A controller outputs, according to the voltage signal obtained by a comparator, a voltage signal that has the largest average power.

In this embodiment, photo-diodes are distributed on one surface with a certain distance. Signals received by the photo-diodes are compared, and a voltage signal that has the largest average power is selected for further processing.

Figure 14:
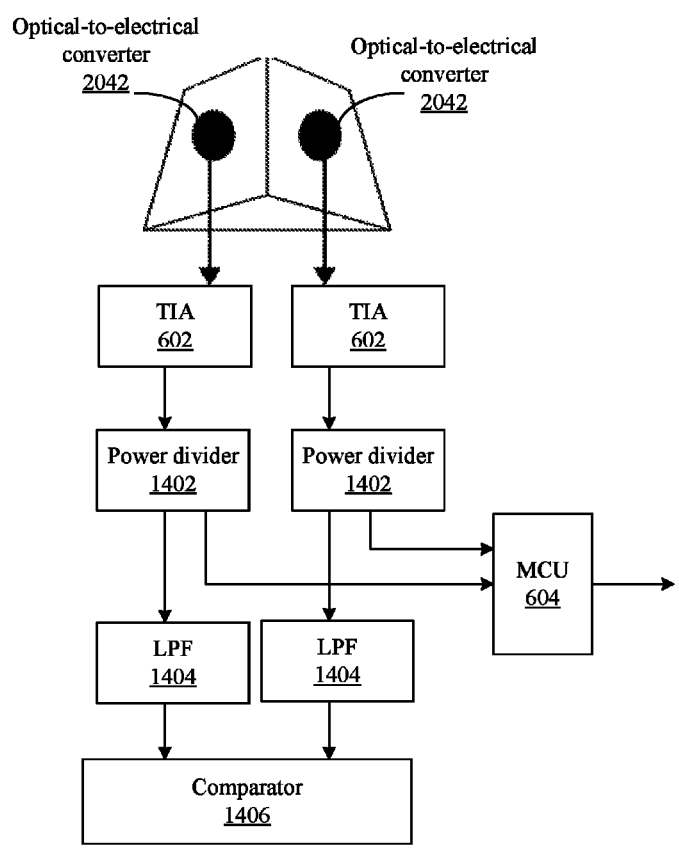
FIG. 14 is a schematic structural diagram of a transmission device for performing visible light transmission by using multiple optical-to-electrical converters according to an embodiment of the present invention.

FIG. 14 is a schematic structural diagram of a method for performing visible light transmission by using multiple optical-to-electrical converters according to an embodiment of the present invention. In this embodiment of the present invention, the optical-to-electrical converter may be a photo-diode. As shown in FIG. 14, the device includes:

multiple optical-to-electrical converters 2042, disposed on a receiving surface of a receiving device in different angles and at different distances, and configured to receive a visible light signal, perform an optical-to-electrical conversion, and output a current signal;

a TIA 602, configured to convert the current signal into a voltage signal, and amplify the voltage signal;

a power divider 1402, configured to divide a voltage signal input by an amplifier 2044 into two signals, with one signal output to an LPF 1404 and the other signal output to an MCU 604;

an LPF 1404, configured to calculate average powers of the voltage signals, which are then compared by a comparator 1406;

the comparator 1406, configured to compare average powers of every two signals, select a voltage signal that has the largest average power, and then feed back the voltage signal to the MCU 604; and the MCU 604, configured to output, according to feedback information from the comparator 1406, a voltage signal that has the largest average power.

An embodiment of the present invention further provides a light communications system. The light communications system is configured to transmit various multimedia data. As a specific application, the light communications system may be a photonic conference system. The following further describes the embodiment by using an example in which the photonic system conference system transmits an audio signal.

Figure 15:
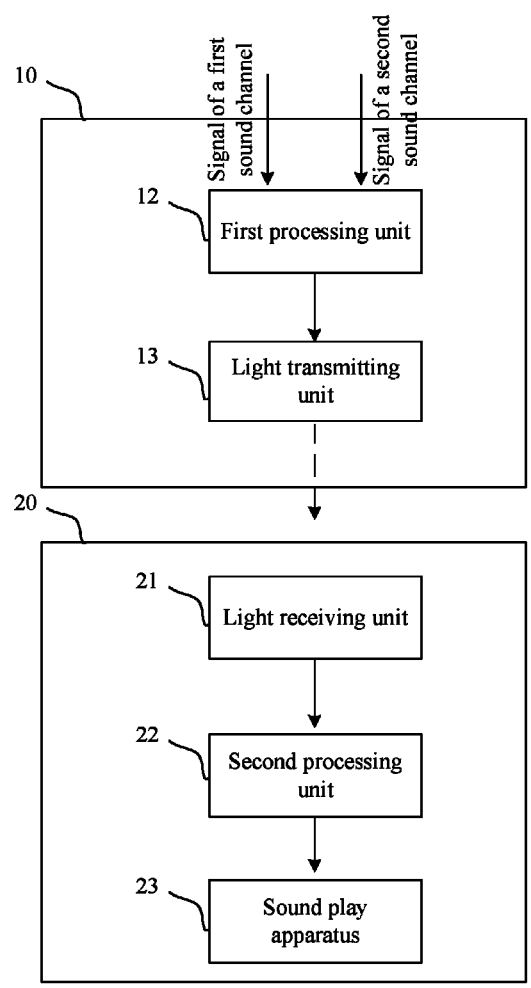
FIG. 15 is a schematic structural diagram of a photonic conference system according to an embodiment of the present invention.

Referring to FIG. 15, FIG. 15 is an implementation manner of a photonic conference system. The photonic conference system includes a light transmitting device 10 and a light receiving device 20. The light transmitting device 10 includes a first processing unit 12 and a light transmitting unit 13, where the first processing unit 12 and the light transmitting unit 13 are connected through signal transmission. The first processing unit 12 is configured to process an input signal, including performing sampling on an input analog signal and an analog-to-digital conversion on sampled data. In some embodiments, the first processing unit 12 is further configured to perform processing such as encryption on a signal obtained after the analog-to-digital conversion. Then, the first processing unit 12 controls, according to processed data, the light transmitting unit 13 to emit light, converts the sampled data to a corresponding light signal sequence, and transmits the light signal sequence. In this embodiment, the light transmitting unit 13 includes an LED. The LED is connected or disconnected under the control of the first processing unit 12, thereby providing different sequences of 1 and 0 by being on and off, and transmits encoded sampled data. In another embodiment, the light transmitting unit 13 may be an LCD or another light emitting source. The light receiving device 20 includes a light receiving unit 21, a second processing unit 22, and a play device 23, where the second processing unit 22 is separately connected to the play device 23 and the light receiving unit 21 through signal transmission, and the play device 23 in this embodiment is an audio play device. The light receiving device 21 is configured to receive the light signal sequence transmitted by the light transmitting unit 13, convert the received light signal sequence to an electrical signal sequence through an optical-to-electrical conversion, and output the electrical signal sequence to the second processing unit 22. The second processing unit 22 is configured to perform processing on an electrical signal, including an analog-to-digital conversion on the electrical signal, and if the electrical signal sequence has a relatively small amplitude, the second processing unit may further amplify the electrical signal. In some embodiments, the second processing unit 22 further performs decoding processing on a signal that has undergone the analog-to-digital conversion. Then the second processing unit 22 performs a digital-to-analog conversion and outputs a digital signal to the play device 23, and drives the play device 23 to play sound through a loudspeaker.

Figure 16:
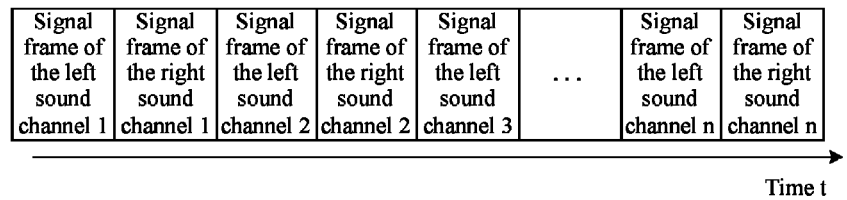
FIG. 16 is a time sequence diagram of a signal frame of a left channel and a signal frame of a right channel.
Figure 17:
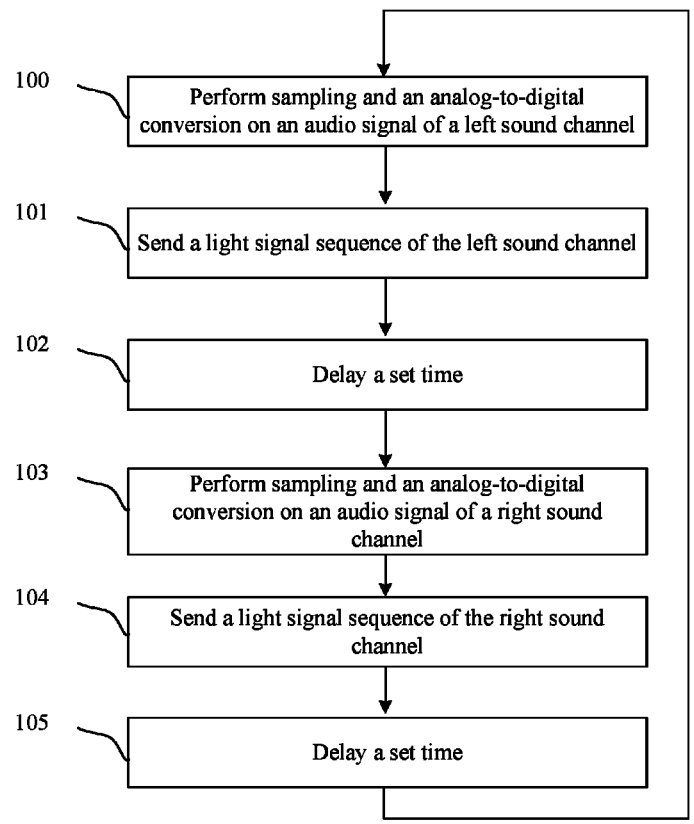
FIG. 17 is a flowchart of a transmitting end according to an embodiment of the present invention.

In the embodiment, a signal input to the light transmitting device 10 is a dual-channel signal, where a first channel signal is an audio signal of a first sound channel, a second channel signal is an audio signal of a second sound channel, and the first processing unit 12 performs time-division sampling on an audio signal of dual sound channels. Each sampling cycle of the first processing unit 12 includes a first sampling period and a second sampling period, and the first processing unit 12 performs sampling on the audio signal of the first sound channel in the first sampling period, and performs sampling on the audio signal of the second sound channel in the second sampling period, so that the first processing unit 12 performs alternate sampling on the audio signal of the first sound channel and the audio signal of the second sound channel. The first processing unit 12 performs processing, such as an analog-to-digital conversion, on sampled data obtained in each sampling period, controls, according to a sampling order, the light transmitting unit 13 to emit light, converts the sampled data to a corresponding light signal sequence, and transmits the light signal sequence. In each sampling period, one sampling point can be sampled, or multiple sampling points can be sampled; therefore, one light signal sequence may express a value, or may express a series of values. The light receiving unit 21 of the light receiving device 20 converts, after receiving the light signal sequence according to a light transmitting order, an optical signal into an electrical signal, and transmits the electrical signal to the second processing unit 22; and the second processing unit 22 identifies the electrical signal sequence, determines a sound channel corresponding to the electrical signal, and outputs, according to an identifying result, a processed electrical signal sequence to a corresponding sound channel of the play device 23. The light signal may be a visible light signal, or a light signal of another waveband. The first sound channel is a left sound channel or a right sound channel, the second sound channel is correspondingly a right sound channel or a left sound channel, and the play device 23 may be a stereo sound equipment or stereo headphone with multiple loudspeakers. The multiple loudspeakers in the stereo sound equipment have at least one loudspeaker for playing an audio signal of a left sound channel and at least one loudspeaker for playing an audio signal of a right sound channel. A stereo headphone generally has two loudspeakers, with one for playing an audio signal of a left sound channel and one for playing an audio signal of a right sound channel. A signal frame transmitted by the light transmitting device 10 and a signal frame received by the light receiving device 20 are shown in FIG. 16, where a signal frame of a left sound channel and a signal frame of a right sound channel are processed alternately.

S100: Perform sampling and an analog-to-digital conversion on an audio signal of a left sound channel.

S101: Send a digital signal of the left sound channel to control an LED to flash, and send audio data of the left sound channel in a form of a light signal.

S102: Delay a set time.

S103: Perform sampling and an analog-to-digital conversion on an audio signal of a right sound channel after the set time is delayed.

S104: Send a digital signal of the right sound channel to control the LED to flash, and send audio data of the right sound channel in a form of a light signal.

S105: Go to S100 after the set time is delayed.

The preceding steps are performed circularly by using a time division multiplexing technology, so as to perform sampling on an audio signal of dual sound channels continuously and transmit sampled data in a form of a light signal.

Figure 18:
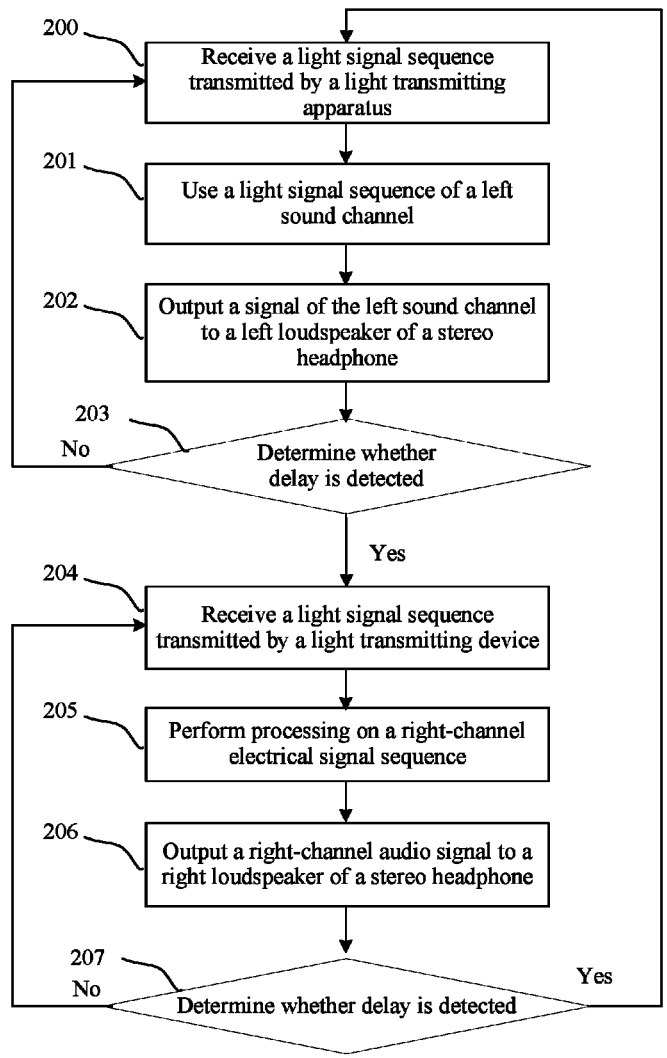
FIG. 18 is a flowchart of a receiving end according to an embodiment of the present invention.

A procedure at a receiving end is shown in FIG. 18 and includes the following steps:

S200: Receive a light signal sequence transmitted by a light transmitting device, and convert the light signal sequence to an electrical signal sequence.

S201: Use the received light signal sequence as data of a left sound channel. Processing such as amplification and A/D conversion is performed on a light signal sequence of a left sound channel, so that an electrical signal sequence is converted into a digital signal. Absolutely, a person skilled in the art should understand amplification on an electrical signal sequence is optional, which depends on actual requirements. For a light signal sequence received for the first time, since the data of the left sound channel is first collected and transmitted, the light signal sequence received for the first time is used as the data of the left sound channel. After processing (such as decoding) is performed on a digitalized electrical signal sequence, a digital-to-analog conversion is performed on the electrical signal sequence, so as to restore the electrical signal sequence to an audio signal.

S202: Output an audio signal of the left sound channel to a left loudspeaker of a stereo headphone, so as to generate sound of the left sound channel.

S203: Determine whether delay is detected, and specifically, determine whether a time interval between two light signals exceeds a set time; if yes, it is determined that delay is detected. If a delay is detected, perform step S204; otherwise, go to step S200.

S204: Receive a light signal sequence transmitted by a light transmitting device, and convert the light signal sequence to an electrical signal sequence.

S205: Use the electrical signal sequence output in S204 as data of a right sound channel, and perform processing such as amplification and A/D conversion on right-channel electrical signal sequence, so as to convert the electrical signal sequence to a digital signal. Similarly, a person skilled in the art should understand amplification on the electrical signal sequence is optional, which depends on actual requirements. After processing (such as decoding) is performed on a digitalized electrical signal sequence, a digital-to-analog conversion is performed on the electrical signal sequence, so as to restore the electrical signal sequence to an audio signal.

S206: Output an audio signal of a right sound channel to a right loudspeaker of the stereo headphone, so as to generate sound of the right sound channel.

S207: Determine whether delay is detected; if yes, go to S200, and receive a next piece of data of the left sound channel; otherwise, go to S204.

By using the foregoing step, audio signal channel transmission of stereo dual channels can be implemented in a one-channel light signal channel. As voice in left and channel channels cannot be transmitted through a headphone to our ears at the same time and since there is a slight delay between the two channels, our ears cannot tell the delay, and thus we can hear stereo sound better than one-channel sound.

In some specific embodiments, a first sampling period may include two sampling periods. Sampling is performed on a first channel audio signal in the two sampling periods, a time interval may be set between the two sampling periods, and there can be no time interval set between the two sampling periods. Or, a second sampling period may also include two sampling periods. Sampling is performed on a second channel audio signal in the two sampling periods, a time interval may be set between the two sampling periods, and there can be no time interval set between the two sampling periods.

Figure 19:
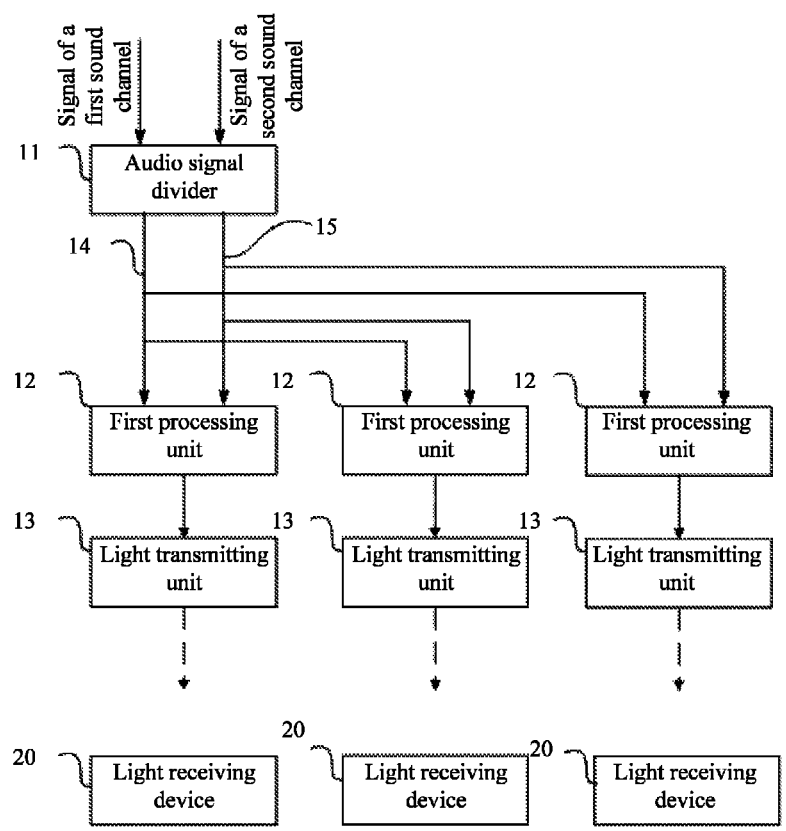
FIG. 19 is a schematic structural diagram of another photonic conference system according to an embodiment of the present invention.

Referring to FIG. 19, to improve a light transmission effect, there are multiple first processing units 12 and multiple light transmitting units 13. A light transmitting device further includes an audio signal divider 11. The audio signal divider 11 is connected to each processing unit 12 with signal transmission, is configured to divide parallel input first channel audio signals and second channel audio signals into multiple groups of first channel audio signal 14 and second channel audio signal 15, and input each group of first channel audio signal 14 and second channel audio signal 15 to corresponding first processing unit 12. The first processing unit 12 and the light transmitting device 13 are connected with signal transmission.

In some embodiments, there may be multiple light receiving devices 20, as shown in FIG. 19, which makes each light receiving device correspond to one user. In this case, the light receiving device is designed to be a mobile device moving with the user.

In another embodiment, the light transmitting device may have one first processing unit and multiple light transmitting units, where the one first processing unit are connected to the multiple light transmitting units with signal transmission.

In another embodiment, to improve a light receiving effect, the light receiving device may have one second processing unit and multiple light receiving units, where the one second processing unit are connected to the multiple light receiving units with signal transmission. Each light receiving device has multiple light receiving units that can enlarge a light receiving size, so as to improve light communication distance and communication quality.

Figure 20:
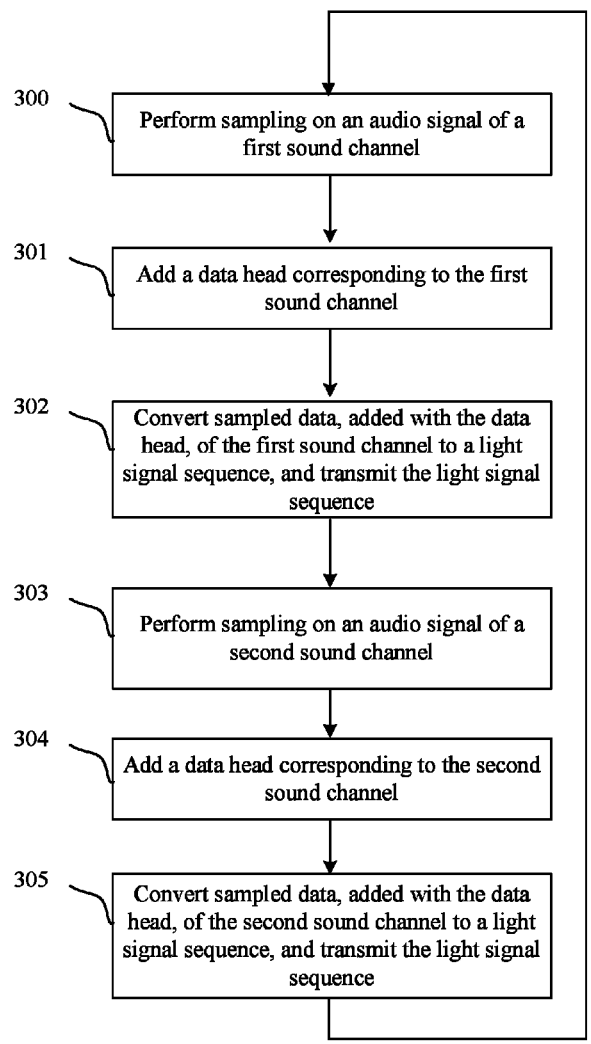
FIG. 20 is a flowchart of another transmitting end according to an embodiment of the present invention.

A difference between the embodiment and the foregoing embodiment lies in that a distinguishing manner of data of each channel is different. In this embodiment, a corresponding data head is added to each channel to distinguish data of different channels. For example, sampling data of a first channel audio signal and a second channel audio signal is added with a data head to distinguish an audio signal of the first channel audio signal and an audio signal of the second channel audio signal. The data head refers to a packet head of a data packet composed by data of each sampling period, and is used to mark the data packet. For example, the first processing unit sets sampling data of each sampling period to a specified format, a format of a data packet sampled in the first sampling period is: first data head+sampling data of the first channel audio signal, and a format of a data packet sampled in the second sampling period is: second data head+sampling data of the second channel audio signal. A procedure in a receive end is shown in FIG. 20 and includes the following steps:

S300: Perform sampling on an audio signal of a first sound channel.

S301: Add, to sampled data of the audio signal of the first sound channel, a data head corresponding to the first sound channel.

S302: Convert the sampled data, added with the data head, of the audio signal of the first sound channel to a light signal sequence by using a light transmitting unit, and transmit the light signal sequence.

S303: Perform sampling on an audio signal of a second sound channel.

S304: Add, to sampled data of the audio signal of the second sound channel, a data head corresponding to the second channel.

S305: Convert the sampled data, added with the data head, of the audio signal of the second sound channel to a light signal sequence by using the light transmitting unit, and transmit the light signal sequence.

Figure 21:
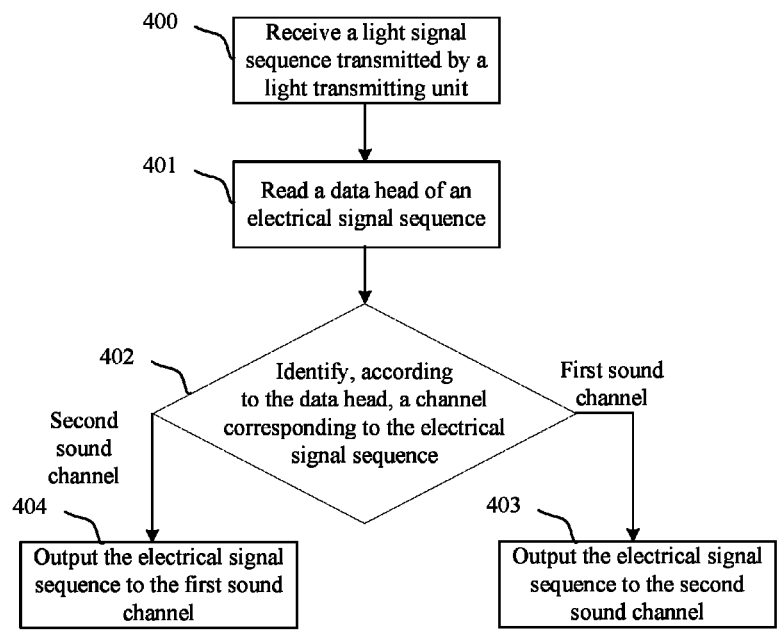
FIG. 21 is a flowchart of another receiving end according to an embodiment of the present invention.

A procedure at a receiving end is shown in FIG. 21 and includes the following steps:

S400: A light receiving unit of a light receiving device receives a light signal sequence transmitted by a light transmitting unit, converts the light signal sequence to an electrical signal sequence, and transmits the electrical signal sequence.

S401: After receiving the electrical signal sequence, a second processing unit of the light receiving device reads a data head of the electrical signal sequence.

S402: Identify, according to the data head, a channel corresponding to the electrical signal sequence. If the data head is a first data head, the channel corresponding to the electrical signal sequence is a first sound channel, and step S403 is performed. If the data head is a second data head, the channel corresponding to the electrical signal sequence is a second sound channel, and step S404 is performed.

S403: Output the electrical signal sequence to the first channel. For example, output the electrical signal sequence to a loudspeaker, for playing an audio signal of the first sound channel, of the play device after a D/A conversion is performed on the electrical signal sequence.

S404: Output the electrical signal sequence to the second sound channel. For example, output the electrical signal sequence to a loudspeaker, for playing an audio signal of the second sound channel, of the play device after a D/A conversion is performed on the electrical signal sequence.

In a specific embodiment, since sampling data of each data is identified by using a data head, a light transmitting device can perform sampling on data of a channel randomly. In a preferred embodiment, the light transmitting device performs sampling on multiple parallel signals in a cycling manner. When a light transmitting device performs sampling on data by using a light transmitting unit, transmission can be performed by not following a sampling order. In a preferred embodiment, a data head includes not only identification information of a corresponding channel but also a sampling serial number. The light receiving device outputs, according to the sampling serial number in the data head, sampling data of each channel the sampling serial number to the corresponding channel according to a sampling order.

Figure 22:
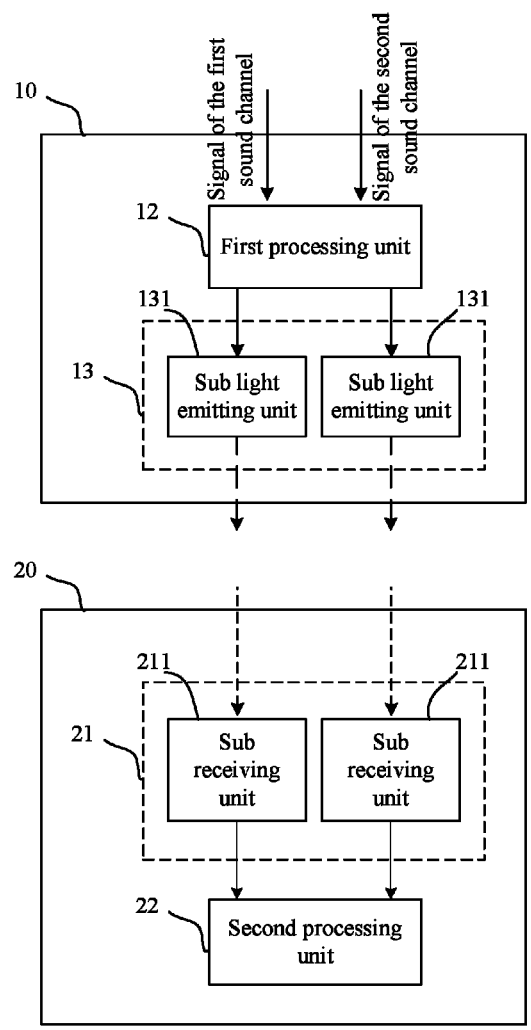
FIG. 22 is a schematic structural diagram of still another photonic conference system according to an embodiment of the present invention.

This embodiment provides another manner of distinguishing data of each channel. In this embodiment, data of different channels is distinguished by converting the data of each channel into light signals of different wavelengths. For example, sampling data of a first channel audio signal is converted into infrared light for transmission, and sampling data of a second channel audio signal is converted into blue light for transmission. FIG. 22 shows a structure of a light communications system, where the system includes a light transmitting device 10 and a light receiving device 20, the light transmitting device 10 includes a first processing unit 12 and a light receiving unit 13, and the first processing unit 12 and the light receiving unit 13 are connected with signal transmission. The light transmitting unit 13 includes sub light-emitting units 131 that correspond to multiple channels one by one and have different light-emitting wavelengths, each sun light-emitting unit 131 is connected to the first processing unit 12 with signal transmission, the first processing unit 12 controls, based on sampling data obtained after processing of each channel, the sub light-emitting unit corresponding to each channel to transmit a light signal sequence, for example, sampling data of a certain channel is used to control a sub light-emitting unit 131 corresponding to the channel to be on or off. The light receiving device 20 includes a light receiving unit 21 and a second processing unit 22. The light receiving unit 21 includes multiple sub-receiving units 211 that correspond to multiple channels one by one and have different filtering wavelengths, each sub-receiving unit 211 is connected to a corresponding interface of the second processing unit 22 with signal transmission, each sub-receiving unit 211 respectively receives a light signal sequence of a corresponding wavelength, for example, the sub-receiving unit 211 has s filter with a specified wavelength and can receive a light signal sequence of the corresponding wavelength. The sub-receiving unit 211 converts the light signal sequence into an electrical signal sequence, and output the electrical signal sequence to a corresponding interface of the second processing unit 22, and the second processing unit 22 identifies a channel corresponding to an electrical signal sequence according to a receiving interface of the electrical signal sequence.

In a specific embodiment, since sampling data of each data is identified by using a light wavelength, a light transmitting device can perform sampling on data of a channel randomly. In a preferred embodiment, the light transmitting device performs sampling on multiple parallel signals in a cycling manner.

In another embodiment, multiple sub light-emitting units may be units of a same light-emitting wavelength. In this case, multiple sub receiving units and multiple light-emitting units of the light receiving unit have a one-to-one correspondence, so that each sub receiving unit receives a light signal sequence of its corresponding sub light-emitting unit. In this embodiment, a light transmitting device can perform sampling on data of a channel randomly when performing sampling on data. In a preferred embodiment, the light transmitting device performs sampling on multiple parallel signals in a cycling manner. By performing transmission of audio signals of dual channels in a wireless photonic conference system provided in the embodiment of the present invention, the audio signals of dual channels can be transmitted in a single-channel light communication channel, so that participants in the wireless photonic conference system can hear more vivid stereo sound and a better effect can be achieved in a receiver end.

The foregoing uses audio signals of dual channels as an example for description. According to the content disclosed in the embodiment of the present invention, a person skilled in the art should understand that the embodiment of the present invention is also applicable to signal of more channels, and is not limited to audio signals, for example, signals of five channels or seven channels. For signals of more channels, a light transmit end performs sampling on signals of multiple channels.

An embodiment of the present invention further provides a visible light signal transmission device. The device includes: a transmitting device, configured to transmit a first signal to an opposite terminal; and a receiving device, configured to receive a second signal transmitted by an opposite terminal, where a frequency of the first signal is different from a frequency of the second signal, and the frequency of the first signal and/or the frequency of the second signal are/is in a frequency band of visible light; the first signal is a visible light signal of a first color, the second signal is a visible light signal of a second color, and the first color and the second color are different; and the receiving device includes: multiple optical-to-electrical converters, disposed in different angles and configured to receive the visible light signal of the second color transmitted by the opposite terminal; and a comparator, configured to compare average powers of visible light signals of the second color that are transmitted by the opposite terminal and received by the multiple optical-to-electrical converters, and configured to select a visible light signal of the second color with a largest average power and perform corresponding processing, so as to obtain an original signal transmitted by the opposite terminal.

In another embodiment of the present invention, the first signal is a visible light signal, and the second signal is an infrared signal, a WIFI signal, or a bluetooth signal.

In still another embodiment of the present invention, the transmitting device includes: an encoder, configured to encode an input electrical signal; a driver, configured to amplify an encoded electrical signal; and an electrical-to-optical converter, configured to perform an electrical-to-optical conversion on the amplified electrical signal to generate the visible light signal of the first color.

In another embodiment of the present invention, the transmitting device further includes: a first light filter, configured to perform a filtration on the visible light signal of the first color generated by the electrical-to-optical converter, so as to obtain a filtered visible light signal of the first color.

In still another embodiment of the present invention, the receiving device includes: an optical-to-electrical converter, configured to perform an optical-to-electrical conversion on the visible light signal of the second color to generate an electrical signal; an amplifier, configured to amplify the electrical signal; and a decoder, configured to decode the amplified electrical signal to obtain the original signal transmitted by the opposite terminal.

In still another embodiment of the present invention, the receiving device further includes: a second light filter, configured to perform a filtration on the visible light signal of the second color, so as to obtain a filtered visible light signal of the second color, where the optical-to-electrical converter is configured to perform an optical-to-electrical conversion on the filtered visible light signal of the second color.

In still another embodiment of the present invention, the original signal is an audio signal.

In still another embodiment of the present invention, the transmitting device further includes: a serial-to-parallel converter, configured to convert an input serial electrical signal to multiple parallel electrical signals; and multiple electrical-to-optical converters, configured to convert the multiple parallel electrical signals to multiple visible light signals of the first color that are parallel and that have different colors, and configured to transmit the multiple visible light signals of the first color that are parallel and that have different colors to the opposite terminal.

In still another embodiment of the present invention, the transmitting device further includes: multiple optical-to-electrical converters, configured to receive multiple visible light signals of the second color that are parallel and transmitted by the opposite terminal and that have different colors, and configured to perform an optical-to-electrical conversion on the multiple visible light signals of the second color that are parallel and that have different colors, to obtain multiple parallel electrical signals; and a parallel-to-serial converter, configured to convert the multiple parallel electrical signals to one electrical signal.

An embodiment of the present invention further provides a visible light signal transmission method. The method includes: transmitting, by a light transmitting device, a first signal to an opposite terminal; and receiving, by a light receiving device, a second signal from the opposite terminal, where a frequency of the first signal is different from a frequency of the second signal, and the frequency of the first signal and/or the frequency of the second signal are/is in a frequency band of visible light; the first signal is a visible light signal of a first color, the second signal is a visible light signal of a second color, and the first color and the second color are different; the visible light signal of the second color from the opposite terminal is received by multiple optical-to-electrical converters disposed in different angles; and average powers of visible light signals of the second color that are from the opposite terminal and that are received by the multiple optical-to-electrical converters are compared, and a visible light signal of the second color that has a largest average power is selected and corresponding processing is performed on the visible light signal, so as to obtain an original signal transmitted by the opposite terminal.

Preferably, the first signal is a visible light signal, and the second signal is an infrared signal, a WIFI signal, or a bluetooth signal.

Preferably, before the transmitting, by a light transmitting device, a first signal to an opposite terminal, the method further includes: encoding an input electrical signal, and amplifying an encoded electrical signal; and performing an electrical-to-optical conversion on the amplified electrical signal to generate the visible light signal of the first color.

Preferably, the step of performing an electrical-to-optical conversion on the amplified electrical signal to generate the visible light signal of the first color includes: performing an electrical-to-optical conversion on the amplified electrical signal to obtain a light signal; and performing a filtration on the light signal to obtain the visible light signal of the first color.

Preferably, after the receiving, by a light receiving device, a second signal from the opposite terminal, the method further includes: performing an optical-to-electrical conversion on the visible light signal of the second color to generate an electrical signal; and amplifying the electrical signal, and decoding the amplified electrical signal, to obtain the original signal transmitted by the opposite terminal.

Preferably, the step of performing an optical-to-electrical conversion on the visible light signal of the second color includes: performing a filtration on the light signal of the second color to obtain a filtered visible light signal of the second color; and performing an optical-to-electrical conversion on the filtered visible light signal of the second color.

Preferably, before the encoding an input electrical signal, the method further includes: converting an audio signal, to generate the electrical signal.

Preferably, the transmitting a visible light signal of a first color to an opposite terminal includes: transmitting multiple visible light signals of the first color that are parallel and that have different colors to the opposite terminal.

Preferably, before the transmitting multiple visible light signals of the first color that are parallel and that have different colors to the opposite terminal, the method further includes: converting an input serial electrical signal to multiple parallel electrical signals; and converting the multiple parallel electrical signals to multiple visible light signals of the first color that are parallel and that have different colors.

Preferably, the receiving the visible light signal of the second color from the opposite terminal includes: receiving multiple visible light signals of the second color from the opposite terminal that are parallel and that have different colors.

Preferably, after the receiving multiple visible light signals of the second color from the opposite terminal that are parallel and that have different colors, the method further includes: performing an optical-to-electrical conversion on the multiple visible light signals of the second color from the opposite terminal that are parallel and that have different colors, to obtain multiple parallel electrical signals; and converting the multiple parallel electrical signals to one electrical signal.

Preferably, before transmitting, by the light transmitting device, a first signal and a second signal to the opposite terminal, the method further includes: performing, by the light transmitting device, processing on sampled data, and converting sampled data processed by each channel to a corresponding light signal sequence; and receiving, by the light receiving device, a first signal and a second signal further comprises:

converting a light signal sequence representing the first signal and the second signal to an electrical signal sequence; performing processing on the electrical signal sequence, and identifying a channel corresponding to the electrical signal sequence; and outputting to the corresponding channel a processed electrical signal sequence according to an identifying result.

Preferably, each sampling cycle of the light transmitting device comprises multiple sampling periods that are in one-to-one correspondences with multiple channels, and the light transmitting device samples signals on a channel corresponding to each sampling period.

Preferably, the converting sampled data processed by each channel to a corresponding light signal sequence and transmitting the light signal sequence includes: converting, according to a sampling sequence, the sampled data processed by each channel to the corresponding light signal sequence, and transmitting the light signal sequence; and the light receiving device identifies a channel corresponding to the light signal sequence based on at least a receiving order of the light signal sequence.

Preferably, upon the converting, according to a sampling sequence, the sampled data processed by each channel to the corresponding light signal sequence, and transmitting the light signal sequence, a specified time interval is set between transmission of light signals of two adjacent channels; and the light receiving device identifies the channel corresponding to the light signal sequence according to a receiving order of the light signal sequence and the time interval between the channels.

Preferably, the step of performing, by the light transmitting device, processing on sampled data includes: adding, to the sampled data of each channel, a data head corresponding to the channel; identifying a channel corresponding to an electrical signal sequence according to a data head of the electrical signal sequence; or the converting sampled data processed by each channel to a corresponding light signal sequence and transmitting the light signal sequence comprises: converting the sampled data processed by each channel to a light signal of a wavelength corresponding to the channel, and transmitting the light signal; and the light receiving device identifies, according to a wavelength of the light signal sequence, the channel corresponding to the light signal sequence.

It can be seen from the above description that the present invention has the following technical effects: resolving a problem in a related technology that poor reliability of uplink and downlink signal transmission is caused when light of a same color is used for uplink and downlink transmission, and providing a beneficial effect of improving reliability of uplink and downlink signal transmission.

The foregoing descriptions are merely exemplary embodiments of the present invention, but are not intended to limit the present invention. Persons skilled in the art understand that the present invention may have various modifications and variations. Any modification, equivalent replacement, and improvement made without departing from the spirit and principle of the present invention shall fall within the protection scope of the present invention.

INDUSTRIAL APPLICABILITY

As described above, a signal transmission method and device provided in the embodiments of the present invention provide the following beneficial effect: resolving a problem in a related technology that poor reliability of uplink and downlink signal transmission is caused when light of a same color is used for uplink and downlink transmission, and providing a beneficial effect of improving reliability of uplink and downlink signal transmission.

What is claimed is:

1. A signal transmission device, wherein the signal transmission device communicates with an opposite terminal, and comprises:
    a transmitting device, configured to transmit a first signal to the opposite terminal; and
    a receiving device, configured to receive a second signal transmitted by the opposite terminal, wherein
    a frequency of the first signal is different from a frequency of the second signal, and the frequency of the first signal and/or the frequency of the second signal are/is in a frequency band of visible light; and the first signal is a visible light signal of a first color, the second signal is a visible light signal of a second color, and the first color and the second color are different; and
    the receiving device comprises: multiple optical-to-electrical converters, disposed in different angles and configured to receive the visible light signal of the second color transmitted by the opposite terminal; and a comparator, configured to compare average powers of visible light signals of the second color that are transmitted by the opposite terminal and received by the multiple optical-to-electrical converters, and configured to select a visible light signal of the second color with a largest average power and perform corresponding processing, so as to obtain an original signal transmitted by the opposite terminal.

2. The signal transmission device according to claim 1, wherein the transmitting device comprises:
    an encoder, configured to encode an input electrical signal;
    a driver, configured to amplify an encoded electrical signal; and
    an electrical-to-optical converter, configured to perform an electrical-to-optical conversion on the amplified electrical signal to generate the visible light signal of the first color.

3. The signal transmission device according to claim 2, wherein the transmitting device further comprises: a first light filter, configured to perform a filtration on the visible light signal of the first color generated by the electrical-to-optical converter, so as to obtain a filtered visible light signal of the first color.

4. The signal transmission device according to claim 3, wherein the receiving device comprises:
    an optical-to-electrical converter, configured to perform an optical-to-electrical conversion on the visible light signal of the second color to generate an electrical signal;
    an amplifier, configured to amplify the electrical signal; and
    a decoder, configured to decode the amplified electrical signal to obtain the original signal transmitted by the opposite terminal.

5. The signal transmission device according to claim 4, wherein
    the receiving device further comprises: a second light filter, configured to perform a filtration on the visible light signal of the second color, so as to obtain a filtered visible light signal of the second color, wherein
    the optical-to-electrical converter is configured to perform an optical-to-electrical conversion on the filtered visible light signal of the second color.

6. The signal transmission device according to claim 1, further comprising:
    a serial-to-parallel converter, configured to convert an input serial electrical signal to multiple parallel electrical signals; and multiple electrical-to-optical converters, configured to convert the multiple parallel electrical signals to multiple visible light signals of the first color that are parallel and that have different colors, and configured to transmit the multiple visible light signals of the first color that are parallel and that have different colors to the opposite terminal.

7. The signal transmission device according to claim 6, further comprising:
multiple optical-to-electrical converters, configured to receive multiple visible light signals of the second color that are parallel and transmitted by the opposite terminal and that have different colors, and configured to perform an optical-to-electrical conversion on the multiple visible light signals of the second color that are parallel and that have different colors, to obtain multiple parallel electrical signals; and
a parallel-to-serial converter, configured to convert the multiple parallel electrical signals to one electrical signal.

8. A signal transmission method, comprising:
transmitting, by a light transmitting device, a first signal to an opposite terminal; and
receiving, by a light receiving device, a second signal from the opposite terminal, wherein a frequency of the first signal is different from a frequency of the second signal, and the frequency of the first signal and/or the frequency of the second signal are/is in a frequency band of visible light;
the first signal is a visible light signal of a first color, the second signal is a visible light signal of a second color, and the first color and the second color are different; and
the visible light signal of the second color from the opposite terminal is received by multiple optical-to-electrical converters disposed in different angles; and
average powers of visible light signals of the second color that are from the opposite terminal and that are received by the multiple optical-to-electrical converters are compared, and a visible light signal of the second color that has a largest average power is selected and corresponding processing is performed on the visible light signal, so as to obtain an original signal transmitted by the opposite terminal.

9. The signal transmission method according to claim 8, wherein before the transmitting, by a light transmitting device, a first signal to an opposite terminal, the signal transmission method further comprises:
encoding an input electrical signal, and amplifying an encoded electrical signal; and
performing an electrical-to-optical conversion on the amplified electrical signal to generate the visible light signal of the first color.

10. The signal transmission method according to claim 9, wherein the step of performing an electrical-to-optical conversion on the amplified electrical signal to generate the visible light signal of the first color comprises:
performing an electrical-to-optical conversion on the amplified electrical signal to obtain a light signal; and
performing a filtration on the light signal to obtain the visible light signal of the first color.

11. The signal transmission method according to claim 8, wherein after the receiving a second signal from the opposite terminal, the signal transmission method further comprises:
performing an optical-to-electrical conversion on the visible light signal of the second color to generate an electrical signal; and
amplifying the electrical signal, and decoding the amplified electrical signal, to obtain the original signal transmitted by the opposite terminal.

12. The signal transmission method according to claim 11, wherein the step of performing an optical-to-electrical conversion on the visible light signal of the second color comprises:
performing a filtration on the light signal of the second color to obtain a filtered visible light signal of the second color; and
performing an optical-to-electrical conversion on the filtered visible light signal of the second color.

13. The signal transmission method according to claim 8, wherein the transmitting a visible light signal of a first color to an opposite terminal comprises: transmitting multiple visible light signals of the first color that are parallel and that have different colors to the opposite terminal.

14. The signal transmission method according to claim 13, wherein before the transmitting multiple visible light signals of the first color that are parallel and that have different colors to the opposite terminal, the signal transmission method further comprises:
converting an input serial electrical signal to multiple parallel electrical signals; and
converting the multiple parallel electrical signals to multiple visible light signals of the first color that are parallel and that have different colors.

15. The signal transmission method according to claim 14 wherein the receiving the visible light signal of the second color from the opposite terminal comprises: receiving multiple visible light signals of the second color from the opposite terminal that are parallel and that have different colors.

16. The signal transmission method according to claim 15, wherein after the receiving multiple visible light signals of the second color from the opposite terminal that are parallel and that have different colors, the signal transmission method further comprises:
performing an optical-to-electrical conversion on the multiple visible light signals of the second color from the opposite terminal that are parallel and that have different colors, to obtain multiple parallel electrical signals; and
converting the multiple parallel electrical signals to one electrical signal.

17. The signal transmission method according to claim 8, wherein before transmitting, by the light transmitting device, a first signal and a second signal to the opposite terminal, the signal transmission method further comprises:
performing, by the light transmitting device, sampling on signals input in parallel from multiple channels;
performing, by the light transmitting device, processing on sampled data, and converting sampled data processed by each channel to a corresponding light signal sequence; and
receiving, by the light receiving device, a first signal and a second signal further comprises:
converting a light signal sequence representing the first signal and the second signal to an electrical signal sequence;
performing processing on the electrical signal sequence, and identifying a channel corresponding to the electrical signal sequence; and
outputting to the corresponding channel a processed electrical signal sequence according to an identifying result.

18. The signal transmission method according to claim 17, wherein each sampling cycle of the light transmitting device comprises multiple sampling periods that are in one-to-one correspondences with multiple channels, and the light transmitting device samples signals on a channel corresponding to each sampling period.

19. The signal transmission method according to claim 18, the converting sampled data processed by each channel to a corresponding light signal sequence and transmitting the light signal sequence comprises: converting, according to a sampling sequence, the sampled data processed by each channel to the corresponding light signal sequence, and transmitting the light signal sequence; and the light receiving device identifies a channel corresponding to the light signal sequence based on at least a receiving order of the light signal sequence.

20. The signal transmission method according to claim 19, wherein upon the converting, according to a sampling sequence, the sampled data processed by each channel to the corresponding light signal sequence, and transmitting the light signal sequence, a specified time interval is set between transmission of light signals of two adjacent channels; and the light receiving device identifies the channel corresponding to the light signal sequence according to a receiving order of the light signal sequence and the time interval between the channels.

* * * * *